(12) United States Patent
Minematsu et al.

(10) Patent No.: US 6,550,000 B1
(45) Date of Patent: Apr. 15, 2003

(54) PROCESSOR TO EXECUTE IN PARALLEL PLURALITY OF INSTRUCTIONS USING PLURALITY OF FUNCTIONAL UNITS, AND INSTRUCTION ALLOCATION CONTROLLER

(75) Inventors: Isao Minematsu, Hyogo (JP); Akira Yamada, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/362,564

(22) Filed: Jul. 28, 1999

(30) Foreign Application Priority Data

Jan. 29, 1999 (JP) .............................. 11-023151

(51) Int. Cl.[7] .............................................. G06F 9/00
(52) U.S. Cl. ....................................... 712/215; 709/313
(58) Field of Search ........................... 712/215, 23, 24, 712/203; 709/313

(56) References Cited

U.S. PATENT DOCUMENTS

| | | | |
|---|---|---|---|
| 5,313,644 A | | 5/1994 | Matsuo et al. ............. 712/228 |
| 5,345,567 A | * | 9/1994 | Hayden ...................... 712/228 |
| 5,392,397 A | * | 2/1995 | Elko ........................... 711/152 |
| 5,664,156 A | * | 9/1997 | Wang .......................... 703/23 |
| 6,311,261 B1 | * | 10/2001 | Chamdani et al. ........... 712/23 |

FOREIGN PATENT DOCUMENTS

| | | |
|---|---|---|
| JP | 63-104130 | 5/1988 |
| JP | 1-26222 | 1/1989 |
| JP | 2-12426 | 1/1990 |
| JP | 7-84758 | 3/1995 |

OTHER PUBLICATIONS

"DSPCPU Architecture/TM1000 Preliminary Data Book" by Gert Slavenburg et al., 1997 pp. 3–1~3–2.

* cited by examiner

*Primary Examiner*—Eric Coleman
(74) *Attorney, Agent, or Firm*—McDermott, Will & Emery

(57) ABSTRACT

In a processor, a plurality of instructions in a program are executed in parallel using a plurality of functional units within the processor. Determination of which functional unit is to be used to execute each instruction is made when the program is produced prior to execution. The processor has the priority as to access of the PSW among the plurality of functional units predetermined when the contents of a PSW (Program Status Word) storage register in the processor are to be accessed simultaneously by a plurality of instructions during parallel execution of a plurality of instructions. Execution control can be provided of a program that reliably avoids a PSW access a conflict by a plurality of instructions during parallel execution of a plurality of instructions using a plurality of functional units in the processor.

13 Claims, 26 Drawing Sheets

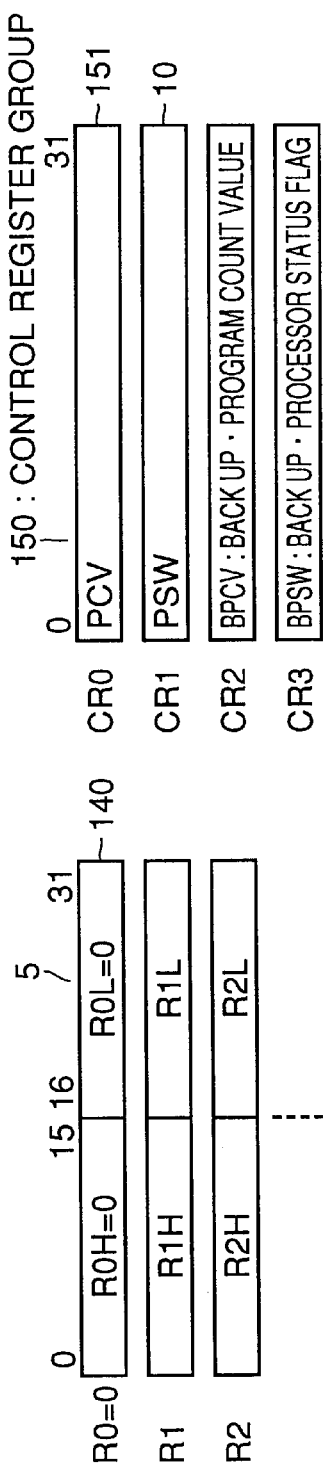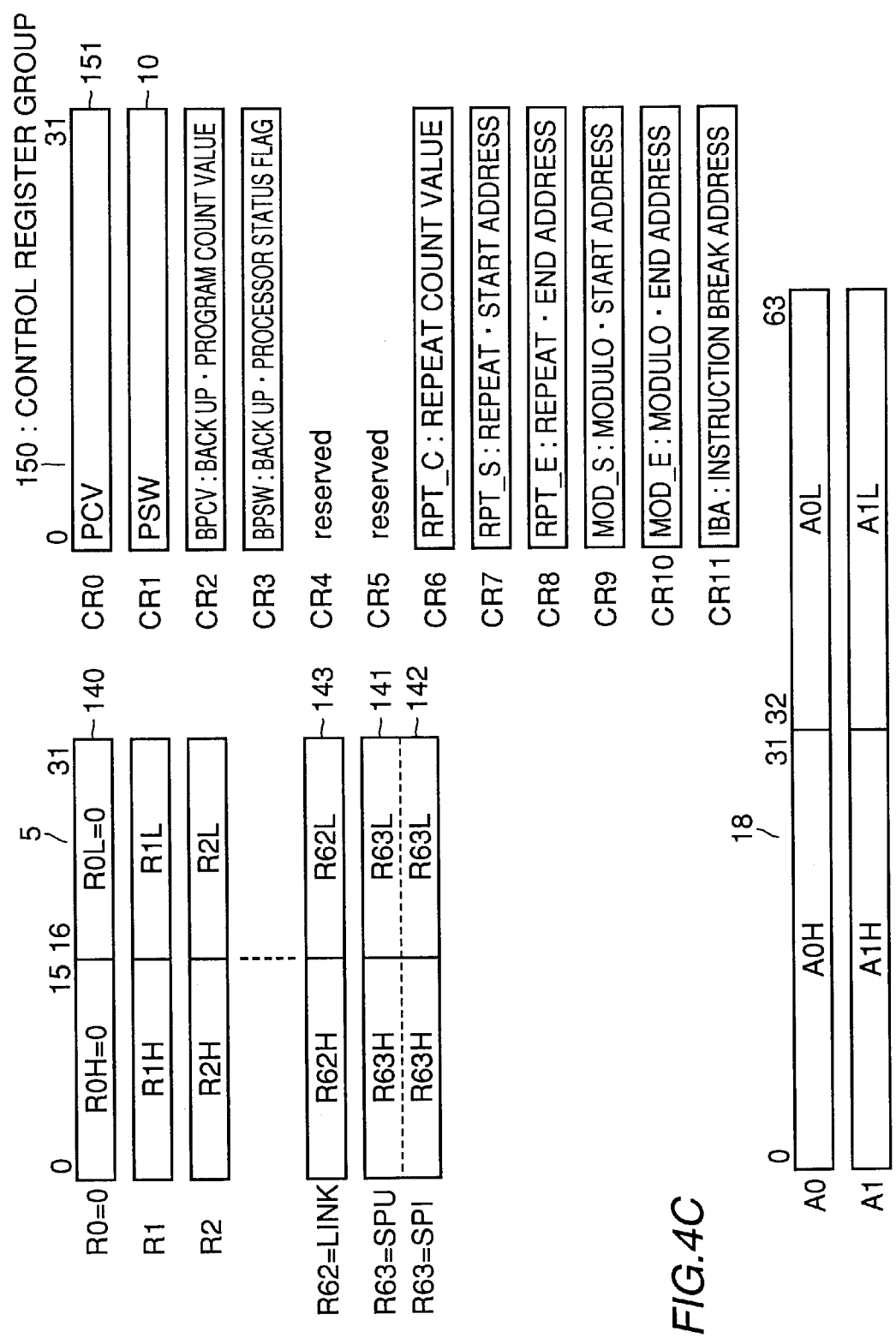

FIG.6

| ADD | NOTATION: (1) ADD Ra, Rb, Rc<br>(2) ADD Ra, Rb, Imm<br>OPERATION: (1) Ra=Rb+Rc<br>(2) Ra=Rb+Imm<br>MODIFIED FLAG: F5(V), F6(VA), F7(C) |
|---|---|
| ADDC | NOTATION: (1) ADDC Ra, Rb, Rc<br>(2) ADDC Ra, Rb, Imm<br>OPERATION: (1) Ra=Rb+Rc+C<br>(2) Ra=Rb+Imm+C<br>MODIFIED FLAG: F5(V), F6(VA), F7(C) |
| ADD2H | NOTATION: (1) ADD2H Ra, Rb, Rc<br>(2) ADD2H Ra, Rb, Imm<br>OPERATION:<br>(1) RaH=RbH+RcH<br>RaL=RbL+RcL<br>(2) RaH=RbH+ImmH<br>RaL=RbL+ImmL<br>MODIFIED FLAG: NONE |

ADD R1, R2, R3
ADD R4, R1, R5
ADD R7, R8, R9
ADD R13, R4, R10
ADDC R10, R11, R12

ADD R1, R2, R3 -> ADD R4, R1, R5
ADD R7, R8, R9 || ADD R13, R4, R10
ADDC R10, R11, R12 || NOP

ADD R1, R2, R3 -> ADD R4, R1, R5
ADD R7, R8, R9 -> ADD R13, R4, R10
ADDC R10, R11, R12 II NOP

FIG.18

ADD R1, R2, R3
ADDC R4, R5, R6
ADD R11, R12, R13
ADDC R14, R5, R6
ADD R20, R4, R14

FIG.19

|       | MEMORY UNIT       | INTEGER UNIT       |
|-------|-------------------|--------------------|
| T=N   | ADD R1, R2, R3    | ADD R11, R12, R13  |
| N+1   | ADDC R4, R5, R6   | ADDC R14, R5, R6   |
| N+2   | ADD R20, R4, R14  | NOP                |

FIG.20

|       | MEMORY UNIT      | INTEGER UNIT       |
|-------|------------------|--------------------|
| T=N   | ADD R1, R2, R3   | NOP                |
| N+1   | ADDC R4, R5, R6  | ADD R11, R12, R13  |
| N+2   | NOP              | ADDC R14, R5, R6   |
| N+3   | NOP              | ADD R20, R4, R14   |

FIG.21

ADD R1, R2, R3
ADDC R10, R5, R6
ADDC R11, R5, R7

FIG.22

|  | MEMORY UNIT | INTEGER UNIT |
|---|---|---|
| T=N | ADD R1, R2, R3 | ADD R1, R2, R3 |
| N+1 | ADDC R10, R5, R6 | ADDC R11, R5, R7 |

FIG.23

|  | MEMORY UNIT | INTEGER UNIT |
|---|---|---|
| T=N | ADD R1, R2, R3 | NOP |
| N+1 | ADDC R10, R5, R6 | ADDC R11, R5, R7 |

FIG.26

| ADD2H | NOTATION: (1) ADD2H Ra, Rb, Rc<br>(2) ADD2H Ra, Rb, Imm |
|---|---|
| | OPERATION:<br>    (1) RaH=RbH+RcH<br>        RaL=RbL+RcL<br>    (2) RaH=RbH+ImmH<br>        RaL=RbL+ImmL |
| | FLAG TO BE MODIFIED: (ONLY WHEN IF=1)<br>  F5a, F5c, F6a, F6c, F7a, F7c (IN MU EXECUTION)<br>  F5b, F5d, F6b, F6d, F7b, F7d (IN IU EXECUTION) |

FIG.29A

PR3 add2h r1, r2, r3 ‖ add2h r11, r12, r13
orfg f0, f5e, 0    ‖ nop
bra/tx err_handler

FIG.29B

PR3 add2h r1, r2, r3 ‖ add2h r11, r12, r13
orfg f0, f5a, f5b ‖ orfg f1, f5c, f5d
orfg f0, f0, f1    ‖ nop
bra/tx err_handler

FIG.30A   SHARED FLAG MODE

.mode shared_flag
(AFTER EXPAND TO MACRO INSTRUCTION)
MVFSYS R1, PSW  ->  BCLR R1, R1, 4
MVTSYS PSW R1    ‖  NOP

FIG.30B   DISCRETE FLAG MODE

.mode dedicated_flag
(AFTER EXPAND TO MACRO INSTRUCTION)
MVFSYS R1, PSW  ->  BSET R1, R1, 4
MVTSYS PSW R1    ‖  NOP

FIG.34

```
.mode dedicated_flag
ADD R1, R2, R3      || ADD R11, R12, R13
ADDC R4, R5, R6  || ADDC R14, R5, R6
ADD R20, R4, R14 || NOP
.mode shared_flag
ADD R1, R2, R3
ADD R4, R1, R5
ADD R7, R8, R9
ADD R13, R4, R10
ADDC R10, R11, R12
```

FIG.35

```
MVFSYS R1, PSW        -> BSET R1, R1, 4
MVTSYS PSW R1         || NOP
ADD R1, R2, R3        || ADD R11, R12, R13
ADDC R4, R5, R6       || ADDC R14, R5, R6
ADD R20, R4, R14      || NOP
MVFSYS R1, PSW        -> BCLR R1, R1, 4
MVTSYS PSW R1         || NOP
ADD R1, R2, R3        -> ADD R4, R1, R5
ADD R7, R8, R9        || ADD R13, R4, R10
ADDC R10, R11, R12 || NOP
```

PROCESSOR TO EXECUTE IN PARALLEL PLURALITY OF INSTRUCTIONS USING PLURALITY OF FUNCTIONAL UNITS, AND INSTRUCTION ALLOCATION CONTROLLER

BACKGROUND OF THE INVENTION

1. Field of the Invention

The present invention relates to a processor to execute in parallel a plurality of instructions using a plurality of functional units, and an instruction allocation controller. Particularly, the present invention relates to a processor in which the VLIW (very-long-instruction-word) system that executes in parallel a plurality of instructions at the same time using a plurality of functional units is applied, and an instruction allocation controller.

2. Description of the Background Art

When a single instruction is executed by a microprocessor, the register in which the operation result is to be stored is specified, and the content of the special register called the flag register is modified, if necessary. The VLIW and superscaler type CPU architectures which have been recently developed are directed to execute instructions in parallel. When a plurality of instructions are to be executed at the same time by the superscaler, the task of allocating each instruction to an appropriate one of the functional unit must be carried out every time. In contrast, since a functional unit in which an instruction is executed is determined on creating a program for a VLIW type processor among a plurality of functional units, the hardware for such a processor can be reduced compared to the one employing superscaler architecture.

Although the microprocessor in which the VLIW is applied can execute a plurality of instructions simultaneously by including a plurality of functional units, it sometimes happens when a flag register is to updated by a plurality of instructions executed in parallel. This is referred to as "conflict". Such a conflict is not preferable since execution of the program will look as if it has stopped when such a conflict occurs. In order to avoid this conflict state, the executing order of the instructions must be scheduled in advance so that a plurality of instructions that will update the content of the flag register are not executed simultaneously. This leads to a decreased number of instructions that are executed in parallel, which means degrading the throughput. There is also the problem that the program is increased m size.

SUMMARY OF THE INVENTION

An object of the present invention is to provide a processor and an instruction allocation controller that can improve the throughput.

Another object of the present invention is to provide a processor and an instruction allocation controller that can reduce the size of the program to be executed.

According to an aspect of the present invention, a processor includes a plurality of functional units. When a plurality of instructions in the program are executed in parallel using a plurality of functional units, determination is made in advance of which of the plurality of functional units is used for execution of respective instructions.

The processor includes a register in which control information that is shared by the plurality of functional units for program execution control is stored and accessed in common by the plurality of functional units, and an arbitration unit arbitrating access according to predetermined priority of control information access among the plurality of functional units when the content of the register is to be simultaneously accessed by the plurality of functional units in the parallel execution of a plurality of instructions.

When simultaneous access of the control information in the register is attempted by a plurality of functional units in program execution in the processor, the access from only one functional unit is made valid by the arbitration unit according to the predetermined priority. As a result, a conflict among the plurality of functional units as to the control information in the register can be avoided.

Since the execution order of instructions does not have to be scheduled to avoid a conflict of access of control information among the plurality of functional units, the number of instructions that can be substantially executed at the same time can be increased than the conventional case. More specifically, the substantial throughput becomes higher, and the size of the program is reduced.

In the register of the processor of the present aspect, control information provided individually for each of the plurality of functional units associated with execution control of the program are also stored.

The arbitration unit includes a first arbitration unit selectively setting a share mode in which the access of shared control information is arbitrated according to the predetermined priority among the plurality of functional units and a discrete mode in which respective individual control information is accessed by a corresponding functional unit when the plurality of functional units attempt to access simultaneously the content of the register in parallel execution of a plurality of instructions.

Therefore, when the content of the register is to be accessed simultaneously by a plurality of functional units in the parallel execution of a plurality of instructions and the share mode is set at the first arbitration unit, the shared control information in the register is accessed according to the predetermined priority among the plurality of functional units. Only the access from one functional unit is enabled. A conflict among the plurality of functional units regarding access of the shared control information is avoided. When the first arbitration unit is set to the discrete mode, each of the plurality of functional units accesses the individual corresponding discrete control information in respective registers. Therefore, a conflict among the plurality of functional units accessing simultaneously the content of the register can be avoided.

Thus, scheduling the execution order of the instructions to avoid such a conflict is no longer required. As a result, the number of instructions that can be substantially executed at the same time increases. In other words, the substantial throughput increases and the size of the program is reduced.

In the processor of the present aspect, either the share mode or the discrete mode is selectively set according to the feature of the program. Therefore, the operational ability can be improved in the mode corresponding to the feature of the program. Also, the specification of the program can be made more versatile.

In the processor of the present aspect, the plurality of instructions include an instruction of designating simultaneously a predetermined operation on a high order half-word and a predetermined operation on a low order half-word. The control information includes at least one flag to indicate the state of a relevant predetermined operation for respective predetermined operations on the high order and low order half-words.

Therefore, the flag to indicate the state of each predetermined operation when a predetermined operation is executed for each half-word by one instruction can be retained in the register. Thus, a conflict among the plurality of functional units can be avoided even when the instruction designating simultaneous predetermined operation on the high order half-word and low order half-word is executed in any of the plurality of functional units in the processor. Such an instruction can be used in a wider application. The development tool of the software can be made more versatile.

In the processor of the present aspect, determination of which of the plurality of functional units is used to execute respective plurality of instructions is made at the stage of assembling the program.

In the present aspect, the processor further includes a particular functional unit differing from the plurality of functional units. The particular functional unit applies a predetermined operation on the control information and writes the value of the result into the register as control information.

Thus, the particular functional unit applies a predetermined operation on the control information that is accessed by a plurality of functional units and writes the resulting value into the register as the control information. Therefore, the generic status of the operation in the processor can be identified by just referring to the register content with no particular postprocess. The program can be reduced in size and complexity.

According to another aspect of the present invention, a processor includes a plurality of functional units. The processor is predetermined of which of the plurality of functional units is used for execution of respective plurality of instructions when a plurality of instructions in the program are to be executed in parallel by a plurality of functional units.

The processor of the present aspect includes a register in which discrete control information regarding execution control of a program provided for each of the plurality of functional units is stored and shared by respective plurality of functional units, and an arbitration unit to have each discrete control information accessed individually by a corresponding functional unit when the plurality of functional units attempt to access simultaneously the content of the register when the parallel execution of a plurality of instructions.

When the plurality of functional units attempt to access the content of the register at the same time, a corresponding discrete control information is accessed individually by each functional unit. A conflict regarding the access of the execution control information of the program in the register by the plurality of functional units encountered in the conventional case is avoided.

It is therefore not necessary to schedule the execution order of the instructions to prevent simultaneous execution of instructions that access information regarding execution control of a program in the register. As a result, the number of instructions that can be executed substantially at the same time can be increased than in the conventional case. More specifically, the substantial throughput is improved. Also, the program size is reduced.

In the processor of the present aspect, the plurality of instructions include an instruction of designating simultaneously a predetermined operation on a high order half-word and a predetermined operation on a low order half-word. The control information includes at least one flag to indicate the status of a relevant predetermined operation for respective operations on the high order and low order half-words.

Therefore, the flag to indicate the status of each predetermined operation when a predetermined operation is executed for each half-word by one instruction can be retained in the register. The above-described a conflict among the plurality of functional units can be avoided even when an instruction that designates simultaneous predetermined operation on a high order half-word and on a low order half-word in the processor is executed by any of the plurality of functional units. Such an instruction can be used in a wider application. The development tool of the software can be made more versatile.

In the processor of the present aspect, determination of which of the plurality of functional units is used to execute respective instructions is made at the assembling stage of the program.

The processor of the present aspect further includes a particular functional unit different from the plurality of functional units. The particular functional unit applies a predetermined operation on discrete control information and writes a resultant value into the register as discrete control information.

Therefore, the generic status of the operation in the processor can be identified by just referring to the content of the register. The program is reduced in size and complexity.

According to a further aspect of the present invention, an instruction allocation control method determines in advance which of a plurality of functional units is used to execute respective instructions for a processor including a plurality of functional units and that executes a program by processing a packet that includes a plurality of fields corresponding to the plurality of functional units and in which a plurality of instructions of the program is stored.

The processor further includes a register that is accessed in common by a plurality of functional units, and in which control information shared by a plurality of functional units regarding execution control of a program is stored. The instruction allocation control method includes a read step of sequentially reading an instruction from a program, and a storage step of allocating and storing the instruction read by the read step to any field in the packet.

The storage step includes a simultaneous access determination step, an allocation determination step, and an allocation step. The simultaneous access determination step determines whether or not the content of the register is accessed simultaneously by the plurality of functional units when a subsequent instruction read in by the read step and a prior instruction already stored in the packet are executed in parallel. The allocation determination step responds to determination of simultaneous access by the simultaneous access determination step to determine whether the prior instruction and the subsequent instruction can be allocated to a field in the same packet according to a predetermined priority. In the allocation step, the prior instruction and the subsequent instruction are respectively allocated to a plurality of fields in the same packet so as to be executed in parallel according to determination of admissible allocation by the allocation determination step, and the prior instruction and the subsequent instruction are respectively allocated to a plurality of fields in the same packet so as to be executed serially according to determination of inadmissible allocation. The predetermined priority corresponds to the priority among the plurality of functional units as to the access of the control information.

According to the instruction allocation control method of the present aspect, a conflict among the plurality of functional units regarding access of control information in the processor when executing a program can be avoided.

Since instructions that access simultaneously control information in instruction execution can be stored in the same packet and applied to the processor, the number of instructions that can be executed at the same time in the processor is increased. Therefore, the substantial throughput is improved. Also, the size of the program is reduced.

The instruction allocation control method of the present aspect is further characterized as follows. The register is set to the operation mode of either a share mode or a discrete mode. In the share mode, the control information shared by the plurality of functional units is stored in the register. In the discrete mode, the control information provided individually for each of the plurality of functional units are stored in the register. The instruction allocation control method further includes a mode set step, a predetermined process step and an execution step. When the instruction read in by the read step is a mode modify instruction that specifies modification of the operation mode of the register, the operation mode of the register is set according to that information in the mode set step. When the discrete mode is set by the mode set step, a predetermined process is executed for the instruction read in by the read step in the predetermined process step. When the share mode is set by the mode set step, the aforementioned storage step is carried out for the information read in by the read step in the execution step.

Since the operation mode of the register can be arbitrarily set variable in the program to be executed, the operation mode of the register can be modified at the user side as desired according to the feature of the program. The operation performance can be further improved.

The instruction allocation control method of the present aspect is applied in the assemble stage prior to execution of the program.

According to still another aspect of the present invention, an instruction allocation controller determines in advance which of the plurality of operation units is used to execute respective plurality of instructions for a processor. The processor includes a plurality of functional units and executes a program by processing with the plurality of functional units a packet that includes a plurality of fields in which a plurality of instructions of the program are stored and corresponding to the plurality of functional units.

The processor further includes a register in which control information shared by the plurality of functional units regarding execution control of the program is stored and accessed by the plurality of functional units.

The instruction allocation controller includes a read unit to sequentially read in an instruction from the program, and a storage unit to allocate and store the instruction read in by the read unit to any of the fields in the packet for storage. The storage unit includes a simultaneous access determination unit, an allocation determination unit and an allocation unit. The simultaneous access determination unit determines whether the content of the register is accessed simultaneously by the plurality of functional units when a subsequent instruction read in by the read unit and a prior instruction prestored in the packet are executed in parallel. The allocation determination unit responds to determination of simultaneous access by the simultaneous access determination unit to determine whether the prior instruction and the subsequent instruction can be allocated to a field in the same packet according to a predetermined priority. The allocation unit responds to determination of admissible allocation by the allocation determination unit to allocate the prior instruction and the subsequent instruction to a plurality of fields in the same packet so as to be executed in parallel, and responds to determination of inadmissible allocation to allocate the prior instruction and the subsequent instruction to a plurality of fields in the same packet so as to be executed serially. The predetermined priority corresponds to the priority among the plurality of functional units as to access of control information.

According to the present aspect, contention among the plurality of functional units regarding access of control information in the processor during program execution can be avoided.

Since instructions that access control information simultaneously in instruction execution are stored in the same packet and applied to the processor, the number of instructions that can be executed simultaneously in the processor is increased. The substantial throughput is improved. Also, the size of the program is reduced.

The instruction allocation control of the present aspect is further characterized as follows.

The register is set to an operation mode of either a share mode or a discrete mode. In the share mode, control information shared by the plurality of functional units is stored into the register. In the discrete mode, control information provided individually for each of the plurality of functional units are stored into the register. The instruction allocation controller further includes a mode set unit, a predetermined process unit and an execution unit. When the instruction read in by the read unit is a mode modify instruction designating modification of the operation mode, the operation mode of the register is set according to that instruction in the mode set unit. When the discrete mode is set by the mode set unit, a predetermined process is executed for the instruction read in by the read unit in the predetermined process unit. When the share mode is set by the mode set unit, the above-described storage unit is executed for the read instruction in the execution unit.

Since the operation mode of the register can arbitrarily be set variable in the program to be executed, the operation mode of the register can be modified as desired by the user according to the feature of the program. The operation ability can further be improved.

In the present aspect, the allocation controller is applied to the assembler for setting the program in an execution format.

A still further aspect of the present invention relates to a computer-readable recording medium in which an instruction allocation control program to have an instruction allocation control method executed by the computer is recorded. The instruction allocation control method predetermines which of a plurality of functional units is used to execute respective plurality of instructions for a processor. The processor includes a plurality of functional units and executes a predetermined program by processing with the plurality of functional units a packet including a plurality of fields corresponding to the plurality of functional units and in which a plurality of instructions of the predetermined program are stored.

The information process further includes a register in which is stored control information shared by the plurality of functional units regarding execution control of the predetermined program. The control information is accessed in common by the plurality of functional units. The instruction allocation control method includes a read step of sequentially reading in an instruction from the predetermined program, and a storage step of allocating and storing the instruction read in by the read step into any of the fields of the packet.

The storage step includes a simultaneous access determination step, an allocation determination step and an allocation step. The simultaneous access determination step determines whether the content of the register is accessed simultaneously when a subsequent instruction read in by a read step and a prior instruction already stored in the packet are executed in parallel. The allocation determination step responds to determination of simultaneous access by the simultaneous access determination step to determine whether the prior instruction and the subsequent instruction can be allocated to a plurality of fields in the same packet according to a predetermined priority. The allocation step responds to admissible allocation determination by the allocation determination step to respectively allocate the prior instruction and the subsequent instruction to the plurality of fields in the same packet so as to be executed in parallel, and responds to determination of inadmissible allocation to respectively allocate the prior instruction and the subsequent instruction to the plurality of fields of the same packet so as to be executed serially. The predetermined priority corresponds to the priority determined among the plurality of functional units regarding access of control information.

Since instructions that access control information during execution can be allocated simultaneously to the plurality of functional units, scheduling is no longer required to prevent simultaneous allocation of a plurality of instructions that access the control information to a plurality of functional units as in the conventional case.

Since instructions that simultaneously access control information during instruction execution can be stored together in the same packet and applied to the processor, the number of instructions that can be executed at the same time in the processor is increased. The substantial throughput is improved. Also, the program is reduced in size.

The recording medium of the present aspect is further characterized as follows.

The register is set to the operation mode of either a share mode or a discrete mode. When in a share mode, control information that is shared by the plurality of functional units is stored. When in a discrete mode, control information that is provided individually for respective plurality of operation units is stored. The instruction allocation control method further includes a mode modification step, a predetermine process step and an execution step. When the instruction read in by the read step is a mode modify instruction designating modification of the operation mode of the register in the mode modification step, the operation mode of the register is set according to that instruction. When the discrete mode is set by the mode set step, a predetermined process is executed for the read instruction in the predetermined process step. When the share mode is set by the mode set step, the storage step is executed for the read in instruction in the execution step.

Since the operation mode of the register can be arbitrarily set variable in the executed predetermined program, the operation mode of the register can be modified as desired by the user according to the feature of the predetermined program. Therefore, the operation ability can be further improved.

The recording medium of the present aspect is further characterized in that the instruction allocation control method is applied in the assemble stage prior to execution of the predetermined program.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A–4C show the structure of various register groups in the microprocessor of FIG. 1.

FIG. 6 shows an example of execution of an operation instruction in the microprocessor of the first embodiment.

FIG. 7 shows a part of an algorithm represented using the instruction notation of the microprocessor of the first embodiment.

FIG. 18 shows an example of a part of an algorithm represented using the instruction notation of a microprocessor 1A of the second embodiment.

FIGS. 19 and 20 show the instruction sequence executed by memory unit 3 and integer unit 4 for the case where the instruction sequence of FIG. 18 is executed at the shortest time.

FIG. 21 shows an example implementing an part of another algorithm using the instruction notation of microprocessor 1A of the second embodiment.

FIGS. 22 and 23 show in time series the instruction executed by memory unit 3 and integer unit 4 for the case where the instruction sequence of FIG. 21 is executed at the shortest time.

FIG. 26 shows the operation specification of an ADD2H instruction applied to the third embodiment.

FIGS. 29A and 29B show a second object program PR3 applied to the fourth embodiment.

FIGS. 30A and 30B show the macro instruction to specify a flag operation mode according to a fifth embodiment of the present invention, and an instruction sequence obtained by the macro expansion.

FIG. 34 shows an example of a portion of an algorithm represented using the instruction notation of the microprocessor and the macro instruction applied to the extended assembler according to the fifth embodiment of the present invention.

FIG. 35 shows an example of packing an instruction sequence of FIG. 34 according to the flow charts of FIGS. 31–33.

DESCRIPTION OF THE PREFERRED EMBODIMENTS

Embodiments of the present invention will be described hereinafter with reference to the drawings.

First Embodiment

Figure 1:
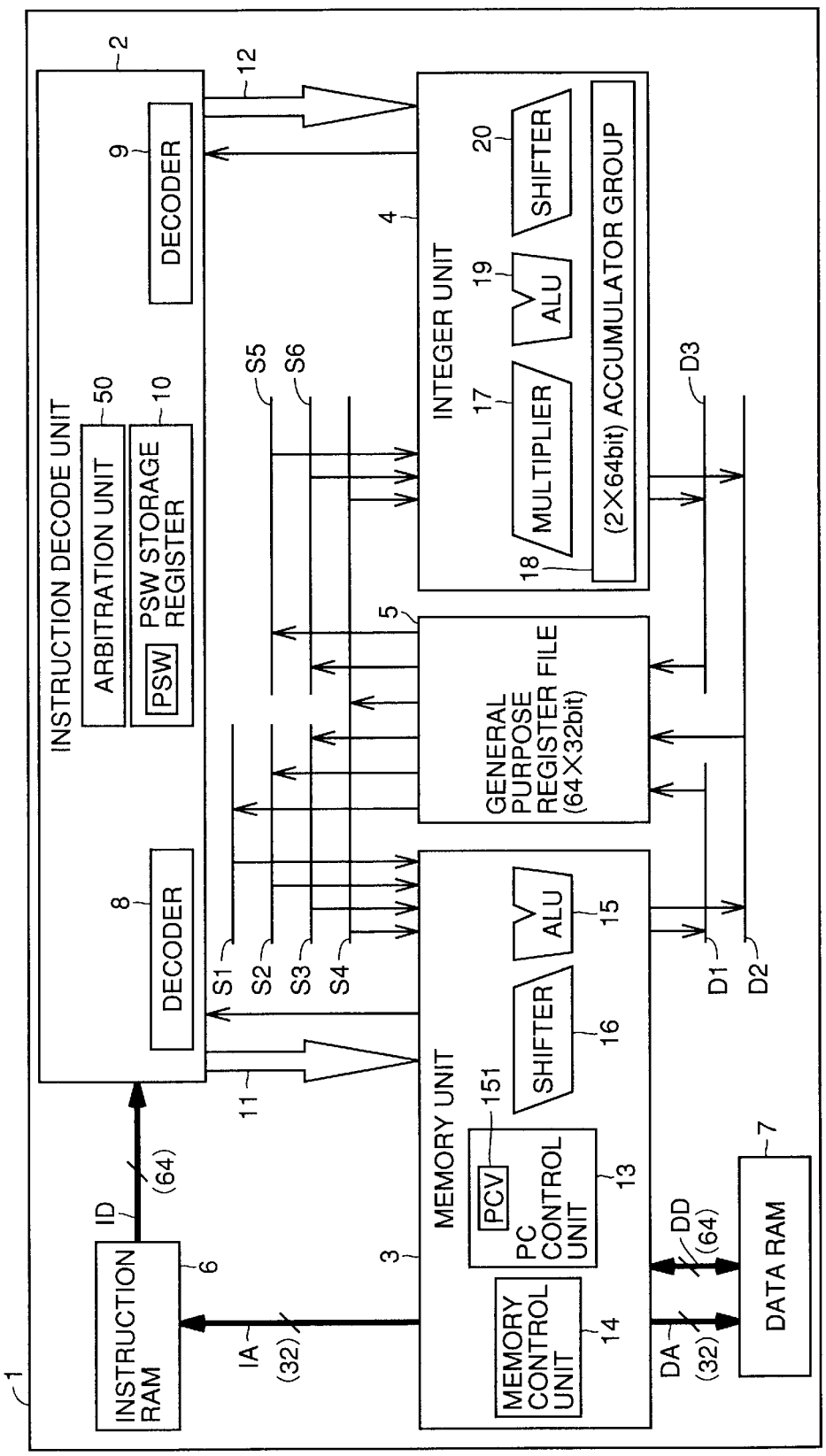
FIG. 1 is a block diagram showing a structure of a microprocessor according to a first embodiment of the present invention.

Referring to FIG. 1, a microprocessor 1 according to a first embodiment of the present invention employs the VLIW system, having an internal data bus of 32 bits in width. In the drawing, the numeric values in the parenthesis indicate the bit width of the corresponding data bus. Microprocessor 1 includes an instruction decode unit 2, a memory unit 3, an integer unit 4, a general purpose register file 5, an instruction RAM (Random Access Memory) 6 in which a plurality of instruction codes are prestored, a data RAM 7 in which a plurality of data are prestored, buses S1–S6 having a width of 32 bits, buses D1–D3, DA and IA, and buses DD and ID having a width of 64 bits. Memory unit 3 and integer unit 4 are provided as a functional unit, respectively.

Instruction decode unit 2 decodes an instruction code input from instruction RAM 6 through bus ID and provides a decoded output. Memory unit 3 is one type of an instruction execution unit to carry out address computation, as will be described afterwards. Integer unit 4 is also a type of an instruction execution unit to carry out logic operation, shift operation, and the like, as will be described afterwards. General purpose register file 5 includes a plurality of general purpose registers, and has a capacity of 32 bits×64 words.

Instruction decode unit 2 includes decoders 8 and 9 decoding an instruction code applied through bus ID, a PSW (Processor Status Word) storage register 10 to store the PSW indicating the status of the processor, and an arbitration unit 50. Instruction decode unit 2 generates and provides to memory unit 3 a control signal 11 according to the instruction decoded result of decoder 8 and the content of PSW storage register 10. Also, instruction decode unit 2 generates and provides to integer unit 4a control signal 12 according to the instruction decoded result of decoder 9 and the content of PSW storage register 10. Memory unit 3 and integer unit 4 access the content in PSW storage register 10 through arbitration unit 50. When a PSW write request is generated simultaneously by units 3 and 4, arbitration unit 50 arbitrates the PSW write request in PSW storage register 10 between memory unit 3 and integer unit 4 according to a predetermined priority.

Memory unit 3 includes a PC control unit 13 having a program counter 151 which is a type of register in which a program count value PCV is stored, a memory control unit 14, an ALU (Arithmetic and Logical Unit) 15 and a shifter 16. PC control unit 13 adds eight to program count value PCV when an instruction that does not include a jump or a branch is executed to compute a program count value PCV for the next instruction to be executed. PC control unit 13 also adds a displacement corresponding to the branch destination to program count value PCV when an instruction including a jump or a branch is executed. Computation according to the addressing mode specified in the operation is carried out to produce a program count value PCV corresponding to the instruction of the jump destination.

Memory control unit 14 provides program count value PCV computed by PC control unit 13 to instruction RAM 6 through bus IA to output an instruction code corresponding to the program count value PCV from instruction RAM 6. Memory control unit 14 also applies the address data to data RAM 7 via bus DA to access data required for executing an instruction through bus DD.

ALU 15 carries out an arithmetic and logical operation using the data of 3 words at most transferred from general purpose register file 5 through buses S1–S3. The operation result is transferred through bus D1 to general purpose register file 5. Shifter 16 carries out a shift operation using the data transferred from general purpose register file 5 through buses S1–S3. The operated result is transferred to general purpose register file 5 through bus D1.

Since the four words of 32-bit data can be transferred at one time to memory unit 3 through buses S1–S4, a two-word instruction, for example, can be executed: storing the content of the first and the second register to memory addressed by the sum of the content of the third and the fourth registers. Also, memory unit 3 can transfer to general purpose register file 5 the operated result of the two words in memory unit 3 or the data of two words transferred from data RAM7 via buses D1 and D2.

Integer unit 4 includes a multiplier 17, an accumulator group 18 having a capacity of 2×64 bits, an ALU 19 and a shifter 20. Multiplier 17 carries out multiplication using the data of 3 words at most transferred from general purpose register file 5 through buses S4–S6 to transfer the multiplied result to general purpose register file 5 via buses D2 and D3. Accumulator group 18 includes two accumulators of 64 bits in capacity. The multiplied result can be added to, or subtracted from, an accumulator, and the result is stored in the accumulator. ALU 19 carnies out an arithmetic and logical operation using the data of 3 words at most transferred from general purpose register file 5 through buses S4–S6. The operational result is transferred to general purpose register file 5 via buses D2 and D3. Shifter 20 carries out a shift operation using the data transferred from general purpose register file 5 via buses S4–S6 to transfer the operational result to general purpose register file 5 through buses D2 and D3.

Microprocessor 1 allows a maximum of six types of register values to be read out simultaneously from general purpose register file 5. The read out data are output to respective buses S1–S6. Also, a maximum of three register values can be written simultaneously via buses D1–D3 to general purpose register file 5.

Figures 2A, 2B:
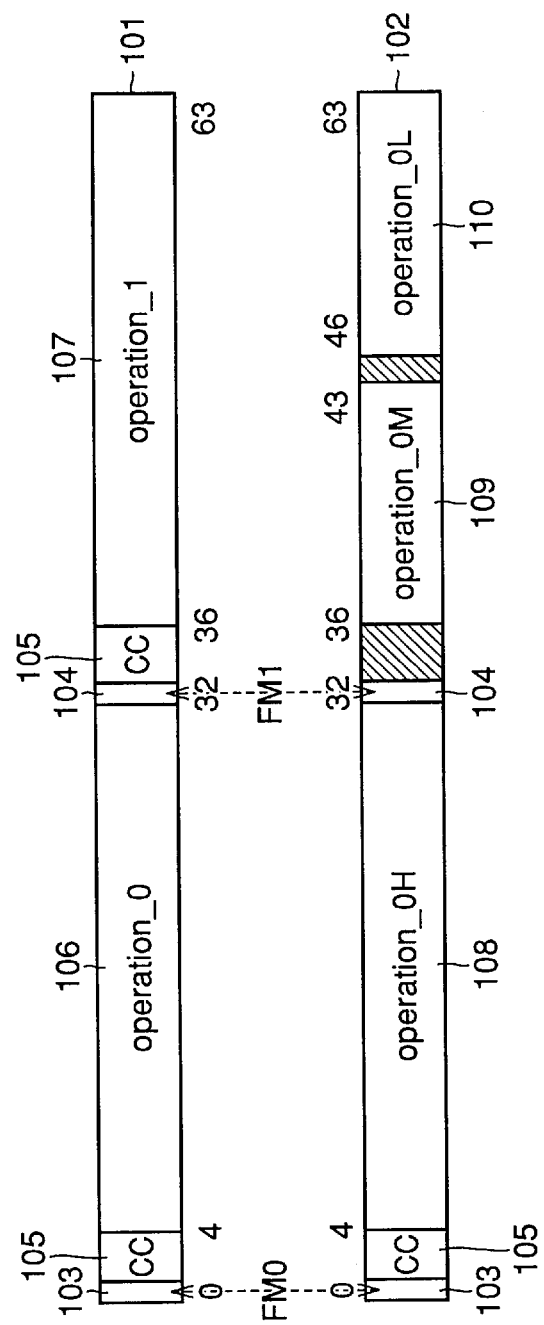
FIGS. 2A and 2B show the instruction format applied to the microprocessor of FIG. 1.

FIGS. 2A–2B show the instruction format employed in microprocessor 1 of FIG. 1. FIG. 2A shows a format 101 of a two-operations instruction designating two operations with one instruction code. FIG. 2B shows a format 102 of a one-operation instruction designating one operation with one instruction code. Two-operations instruction format 101 includes format fields 103 and 104, operation fields 106 and 107, and execution condition fields 105 attached to respective operation fields 106 and 107. One-operation instruction format 102 includes format fields 103 and 104, operation fields 108–110, and an execution condition field 105 attached to operation fields.

A code FM in the format field has the following meaning.

|  | Order of execution | |
|---|---|---|
| Code: format | operation__0 | operation__1 |
| FM = 00: 2 operations | first | first |
| 01: 2 operations | first | second |
| 10: 2 operations | second | first |
| 11: 1 operation | first | . . . |

Here, code FM is a two-bits value of fields 103 and 104.

Code FM=00 indicates that the corresponding instruction is a operations instruction. The operation of operation__0 designated by operation field 106 and the operation of operation__1 designated by operation field 107 are executed in parallel at the clock cycle light after decoding. The operation of operation__0 is executed by memory unit 3. The operation of operation__1 is executed by integer unit 4. Code FM=01 indicates that the instruction is a two-operations instruction. The operation of operation__0 is executed at the clock cycle right after decoding, and the operation of operation__1 is executed one clock cycle behind the operation of operation__0. Code FM=10 indicates that the instruction is a two-operations instruction. The operation of operation__1 is executed at the clock cycle right after decoding, and the operation of operation__0 is executed one clock behind the operation of operation__1. Code FM=11 indicates that the instruction is a one-operation instruction. One operation designated by the operation fields of 108–110 is executed by either integer unit 4 or memory unit 3 at the clock cycle right after decoding.

Code CC in execution condition field 105 has the following meaning.

Code: execution condition
CC=000: always
   001: F0=true and F1=don't care
   010: F0=false and F1=don't care
   011: F0=don't care and F1=true
   100: F0=don't care and F1=false
   101: F0=true and F1=true
   110: F0=true and F1=false
   111: reserved According to the value of code CC in execution condition field 105 and the values of execution control flags F0 and F1 that will be described afterwards, determination is made whether the operation indicated by operation__0 and operation__1 of operation fields 106 and 107 and the operation indicated by the content of operation fields 108–110 are valid or invalid. When the operation is valid, the operation is executed as designated in the operation field. When the operation is invalid, on the other hand, the operation is not executed, and a no operation (NOP) instruction is executed instead of the operation.

When code CC=000 in execution condition field 105, the operation is always valid irrespective of the values of execution control flags F0 and F1. When code CC=001, the operation is valid only when execution control flag F0=true. Execution control flag F1 can take any status. When CC=010, the operation is valid only when execution control flag F0=false. Execution control flag F1 can take any status. When code CC=011, the operation is valid only when execution control flag F1=true. Execution control flag F0 can take any status. When CC=100, the operation is valid only when execution control flag F1=false. Execution control flag F0 can take any status. When code CC=101, the operation is valid only when execution control flag F0=true and F1=true. When code CC=110, the operation is valid only when execution control flags F0=true and F1=false. The operation is undefined when code CC=111. The user cannot use an instruction that induces code CC=111.

Figure 3A:
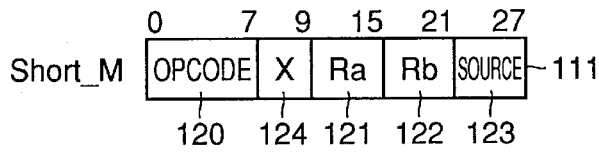
FIGS. 3A–3I show the detailed contents of operation fields 106–110 of FIGS. 2A and 2B.
Figure 3B:
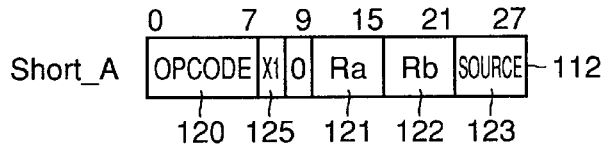
Figure 3C:
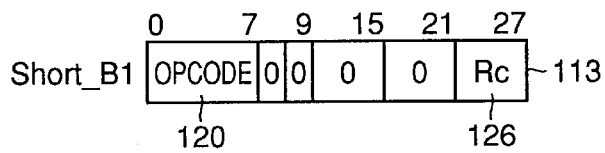
Figure 3D:
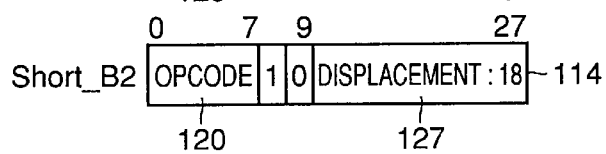
Figure 3E:
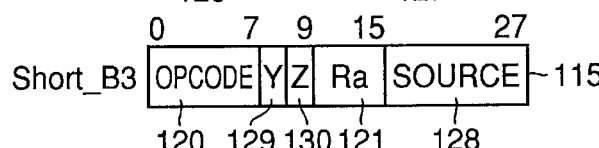
Figure 3F:
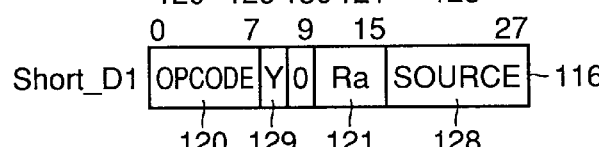
Figure 3G:
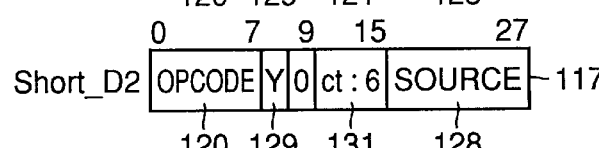
Figure 3H:
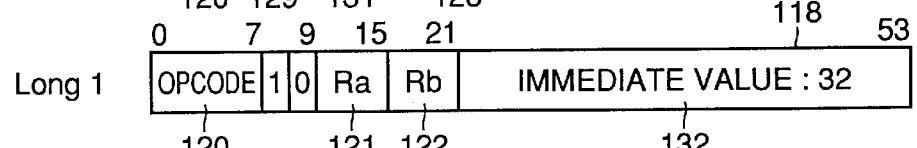
Figure 3I:
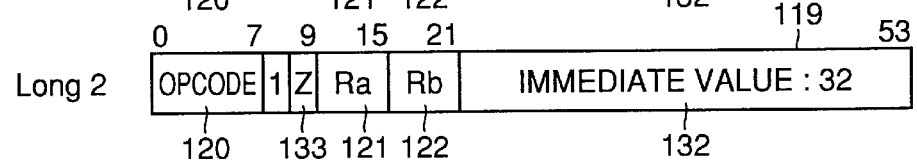

FIGS. 3A–3I show the detailed contents of operation fields 106–110 of FIGS. 2A and 2B. Format 111 of FIG. 3A—format 117 of FIG. 3G are applied to a short type operation field 106 or 107 represented at the length of 28 bits respectively. Formats 118 and 119 of FIGS. 3H and 3I are applied to long type operation fields that are formed including fields 108–110.

Format 111 (Short__M) of FIG. 3A includes a field 120 storing an opcode (operation code) specifying the content of the operation, fields 121 and 122 storing register numbers Ra and Rb, a field 123 storing either the register number or the immediate 6-bit length value (source), and a field 124 in which a code X is stored that specifies whether the content of field 123 is the register number or an immediate value. When code X in field 124 is "00", "01" or "11", the value in field 123 is a register number. When code X in field 124 is "10", the value in field 123 is an immediate value. Format 111 is applied to the memory access operation of addressing indirectly the register in memory unit 3.

Format 112 (Short__A) of FIG. 3B includes fields 120–123 of format 111 of FIG. 3A, and a field 125 storing a code X1 indicating whether the content in field 123 is a register number or an immediate value. When the value of the code X1 is 0, the content of the field 123 is a register number: when the value of the code X1 is 1, the content of the field 123 is an immediate. Format 112 is applied to the arithmetic operation, logic operation, shift operation and bit operation for memory unit 3 and integer unit 4.

Format 113 (Short__B1) of FIG. 3C includes a field 120 storing an opcode specifying the operation content, and a field 126 storing a register number Rc. Format 113 is applied to an instruction jumping or branching to the address specified by the content of the register at the memory unit 3 side.

Format 114 (Short__B2) of FIG. 3D includes a field 120 storing an opcode 120, and a field 127 storing a displacement of 18 bits in length. Format 114 is applied to the jump instruction and the branch instruction executed at memory unit 3 side.

Format 115 (Short__B3) of FIG. 3E includes a field 120 storing an opcode, a field 121 storing a register number Ra, a field 128 storing either (source) a register number or an immediate value of 12 bits in length, a field 129 storing a code Y specifying whether the content of field 128 is a register number or an immediate value, and a field 130 storing a code Z specifying whether to jump or branch to the address indicated by the content of field 121 according to a zero decision. Format 115 is applied to a jump instruction and a branch instruction according to a predetermined condition at the memory unit 3 side.

Format 116 (Short__D1) of FIG. 3F includes a field 120 storing an opcode, a field 121 storing a register number Ra, a field 128 storing either (source) a register number or an immediate value of 12 bits in length, and a field 129 storing a code Y designating whether the content of field 128 is a register number or an immediate value. Format 116 is applied to a jump instruction according to a predetermined condition, a branch instruction according to a predetermined condition, and a repeat instruction.

Format 117 (Short_D2) of FIG. 3G includes a field 120 storing an opcode, a field 128 storing either (source) a register number or an immediate value of 12 bits in length, and a field 129 storing code Y specifying whether the content of field 128 is a register number or an immediate value, and a field 131 storing information associated with a delayed instruction. Format 117 is applied to a delayed jump instruction, a delayed branch instruction, and a repeat instruction.

Format 118 (Long1) of FIG. 3H includes a field 120 storing an opcode, fields 121 and 122 storing register numbers Ra and Rb, and a field 132 storing an immediate value of 32 bits in length. Format 118 is used in complicated arithmetic operations, arithmetic operations using a large immediate value, register indirect addressing memory access operations with a large displacement, branching operations using a large displacement, jumping instructions to an absolute address, and the like.

Format 119 (Long2) of FIG. 3I includes a field 120 storing an opcode, fields 121 and 122 storing register numbers Ra and Rb, respectively, a field 132 storing an immediate value of 32 bits in length, and a field 133 storing a code Z specifying whether to carry out address jumping or branching according to the content of field 132 on the basis of a zero decision result (conditional jump or jump branching). Format 119 is used in conditional jumping or conditional branching to an address indicated with a great displacement.

FIGS. 4A–4C show the structure of each type of register group in microprocessor 1 of FIG. 1. Microprocessor 1 of FIG. 1 includes a general purpose register file 5 formed of 64 general purpose registers of 32 bits in length shown in FIG. 4A, a control register group 150 (not shown in FIG. 1) formed of 12 control registers shown in FIG. 4B, and an accumulator group 18 formed of two accumulators shown in FIG. 4C.

In FIG. 4A, the content of general purpose register 140 is always 0, and a writing operation into this register is ignored. General purpose register 143 is a link register specified with an address indicating the return destination from a subroutine. General purpose register 141 is a stack pointer. It is used as a user-oriented stack pointer (SPU) according to the value in the SM field of PSW that will be described afterwards, or a stack pointer (SPI) for an interruption process.

Control register group 150 of FIG. 4B includes program counter 151 of FIG. 1, a PSW storage register 10, and various dedicated registers. In FIG. 4B, PSW store register 10 and the register storing a back up processor status flag BPSW are provided in instruction decode unit 2 of FIG. 1. Program counter 151 and the register storing back up program count value BPCV are provided in memory unit 3. The other registers of control register group 150 of FIG. 4B are provided at the memory unit 3 side.

In an operation according to an instruction employing format 112 of FIG. 3B, the upper 16 bits and the lower 16 bits of the 64 registers in general purpose register file 5 can be accessed individually. Also, the upper 32 bits and the lower 32 bits can be accessed individually for the two respective accumulators of FIG. 4C.

Figure 5:
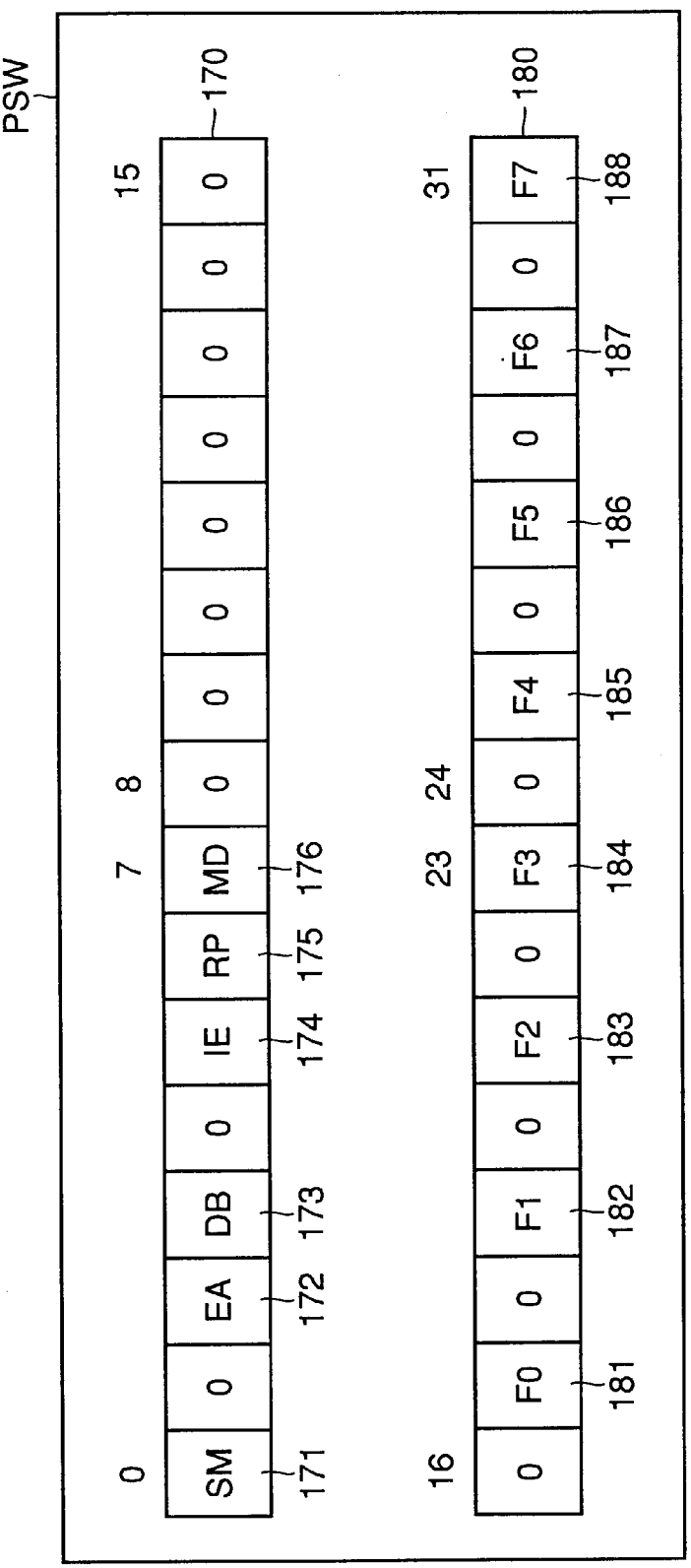
FIG. 5 shows the detail of the PSW applied to the first embodiment of the present invention.

The detailed contents of the PSW applied to the first embodiment are shown in FIG. 5. PSW 10 includes a upper half-word 170 corresponding to the upper 16 bits and a lower half-word 180 corresponding to the lower 16 bits.

Upper half-word 170 includes a field 171 storing a flag SM to switch stack pointers 141 and 142 of FIG. 4A to a user stack pointer or an interrupt stack pointer, a field 172 storing a flag EA indicating a detection result of a software debugger trap (SDBT), a field 173 storing a flag DB specifying whether SDBT is enabled/disabled, a field 174 storing a flag IE specifying whether an interrupt is masked or not, a flag 175 storing a flag RP specifying whether the repeat block associated with the repeat operation is active or inactive, and a field 176 storing a flag MD specifying whether modulo addressing is enabled or not.

Lower half-word 180 is the field storing various flags that have their contents updated by memory unit 3 and integer unit 4. Lower half-word 180 is referred to as "flag field" hereinafter. Flag field 180 includes fields 181 and 182 storing execution control flags F0 and F1 described already, fields 183 and 184 storing general purpose flags F2 and F3, a field 185 storing a flag F4 indicating a saturation operation such as an operation result value of a saturated state, a field 186 storing a flag F5 indicating the occurrence of overflow in the operation, a field 187 storing a flag F6 indicating the occurrence of overflow associated with an accumulated value in the operation, and a field 188 storing a flag F7 indicating occurrence of carry/borrow in the operation.

The value of each flag in flag field 180 is updated according to the result of the comparison or arithmetic operation. Also, the value is initialized at the flag initialization, and updated using an arbitrary value by a flag value write operation. The content of flag field 180 is read out by a flag value read out operation.

Each flag has the following meaning.

SM=0: stack mode 0→SPU used
SM=1: stack mode 1→SPI used
EA=0: SDBT undetected
EA=1: SDBT detected
DB=0: SDBT disabled
DB=1: SDBT enabled
IE=0: interrupts are masked
IE=1: interrupts are not masked
RP=0: repeat block inactive
RP=1: repeat block active
MD=0: modulo addressing disabled
MD=1: modulo addressing enabled
F0: general purpose flag (execution control flag)
F1: general purpose flag (execution control flag)
F2: general purpose flag
F3: general purpose flag
F4 (S): saturated operation flag
F5 (V): overflow flag
F6 (VA): accumulated overflow flag
F7 (C): carry/borrow flag Instructions of the microprocessor are listed as follows.

A. Instruction Associated with Microprocessor Feature
  A-1. Load/store Instruction
    LDB: Load one byte to a register with sign extension
    LDBU: Load one byte to a register with zero extension
    LDH: Load one half-word to a register with sign extension
    LDHH: Load one half-word to a register high with sign extension
    LDHU: Load one half-word to a register with zero extension LDW: Load one word to a register
LD2W: Load two words to registers
LD4BH: Load four bytes to four half-words in two registers with sign extension
LD4WHU: Load four bytes to four half-words in two registers with zero extension
LD2H: Load two half-words in two words in two registers with sign extension
STB: Store one byte from a register
STH: Store one half-word from a register
STHH: Store one half-word from a register high
STW: Store one word from a register
ST2W: Store two words from registers
ST4HB: Store four bytes from four half-words from two registers
ST2H: Store two half-words from two registers
MODDEC: Decrement a register value by a five-bits immediate mvalue
MODINC: Increment a register value by a five-bits immediate value A-2. Transfer Instruction MVFSYS: Move from a control register to a general purpose register
MVTSYS: Move from a general purpose register to a control register
MVFACC: Move a word from an accumulator
MVTACC: Move from two general purpose registers to an accumulator A-3. Comparison Instruction CMPcc: Compare
  cc=EQ (equal), NE (not equal), GT (greater),
  GE (equal or greater), LT (less than),
  LE less or equal), PS (both positive),
  NG (both negative)
CMPUcc: Compare unsigned
  cc=GT, GE, LT, LE A-4. Maximum Value/minimum Value Instruction
Reserved A-5. Arithmetic Operation Instruction ABS: Absolute
ADD: Add
ADDC: Add with carry
ADDHppp: Add half-word
  ppp=LLL (lower half-word, lower half-word, lower half-word), LLH (lower half-word, lower half-word, upper half-word), LHL, LHH, HLL, HLH, HHL, HHH
ADDS: Add register Rb with the sign the third operand
ADDS2H: Add sign to two half-words
ADD2H: Add two pairs of half-words
AVG: Average with rounding towards positive infinity
AVG2H: Average two pairs of half-words rounding towards positive infinity
JOINpp: Join two half-words
  pp=LL, LH, HL, HH
SUB: Subtract
SUBB: Subtract with borrow
SUBHppp: Subtract half-word
  ppp=LLL, LLH, LHL, LHH, HLL, HLH, HHL, HHH
SUB2H: Subtract two pairs of half-words A-6. Logical Operation Instruction AND: logical AND
OR: logical OR
NOT: logical NOT
XOR: logical exclusive OR
ANDFG: logical AND flags
ORFG: logical OR flags
NOTFG: logical NOT flag
XORFG: logical exclusive OR flags A-7. Shift Operation Instruction SRA: Shift right arithmetic
SRA2H: Shift right arithmetic two half-words
SRC: Shift right concatenated registers
SRL: Shift right logical
SRL2H: Shift light logical two half-words
ROT: Rotate right
ROT2H: Rotate right two half-words A-8. Bit Operation Instruction BCLR: Clear a bit
BNOT: Invert a bit
BSET: Set a bit
BTST: Test a bit A-9. Branch Instruction BRA: Branch
BRATZR: Branch if zero
BRATNZ: Branch if not zero
BSR: Branch to subroutine
BSRTZR: Branch to subroutine if zero
BSRTNZ: Branch to subroutine if not zero
JMP: Jump [unconditional jump]
JMPTZR: Jump if zero
JMPTNZ: Jump if not zero
JSR: Jump to subroutine
JSRTZR: Jump to subroutine if zero
JSRTNZ: Jump to subroutine if not zero
NOP: No Operation

[Instruction Associated with Delayed Branching, Jumping]

DBRA
DBRAI
DBSR
DBSRI
DJMP
DJMPI
DJSR
DJSRI

A-10. OS-related Instruction

TRAP: Trap
REIT: Return from exception, interrupts and traps

B. DSP Function Instruction

B-1. Arithmetic Operation Instruction

MUL: Multiply
MULX: Multiply with extended precision
MULXS: Multiply and shift to the light by one with extended precision
MULX2H: Multiply two pairs of half-words with extended precision MULHXpp: Multiply two half-words with extended precision
pp=LL, LH, HL, HIGH
MUL2H: Multiply two pairs of half-words
MACa: Multiply and add
a (accumulator specification)=0, 1
MACSa: Multiply, shift to the light by one and add a=0, 1
MSUBa: Multiply and subtract a=0, 1
MSUBSa: Multiply, shift to the light by one and subtract a=0, 1
[Instruction for Saturated Operation]
SAT
SATHH
SATHL
SATZ
SATZ2H
SAT2H
B-2. Repeat Instruction
REPEAT: Repeat a block of instructions
REPEATI: Repeat a block of instructions immediate In microprocessor 1 of the first embodiment, an instruction modifying flags F0–F7 of FIG. 5 is executed by memory unit 3 or integer unit 4. Therefore, a conflict can occur when both of the operations executed in parallel in memory unit 3 and integer unit 4 are to update one of flags F0–F7. An instruction associated with a conflict during execution includes a transfer instruction MVTSYS executed at the memory unit 3 side, arithmetic operation instructions SATHL and SATHH executed by integer unit 4, comparison instructions CMPcc and CMPUcc executed at memory unit 3 and also integer unit 4, logic operation instructions ANDFG, ORFG, NOTFG and XORFG, arithmetic operation instructions ADD, ADDC, ADDS, ADDHppp, SUB, SUBB, and SUBHppp, and bit operation instructions BSET, BCLR, and BNOT.

FIG. 6 shows execution examples of operation instructions according to microprocessor 1 of the first embodiment. Instructions ADD and ADDC are taken as examples with respective notations and operations indicated. Registers Ra, Rb and Rc respectively correspond to an arbitrary register in general purpose register file 5. Upon execution of instructions ADD and ADDC of FIG. 6, the eventual operation result is stored in general purpose register Ra. Also, the values of overflow flag F5, accumulated overflow flag F6, and carry/borrow flag F7 of flag field 180 shown in FIG. 5 are updated according to the operational result.

In FIG. 6, an operation using an immediate value of Imm is shown. When immediate value Imm can be represented by 6 bits and general purpose register Rc is specified, instructions ADD and ADDC of FIG. 6 are encoded according to format 112 of FIG. 3B and stored in operation fields 106 and 107, respectively, in two-operations instruction 101 of FIG. 2A. When immediate value Imm is too large to be represented by 6 bits, the instructions are encoded according to format 118 of FIG. 3H, and stored in operation fields 108–110 of one-operation instruction 102 of FIG. 2B.

The value of code FM which are stored in format fields 103 and 104 of two-operations instruction 101 is indicated by a symbol located between the notation of the two operation instructions corresponding to operation fields 106 and 107. Specifically, the sign of | |, –>, <– and an empty space (specification not required) are used when code FM=00,=01,=10 and=11, respectively. In one-operation instruction 102, the corresponding symbols are indicated by an empty space since the value of code FM in format fields 103 and 104 is fixed to=11 and does not have to be specified. The contents of format fields 103 and 104 will not be modified during program execution in microprocessor 1.

When code FM=00, operation_1 stored in operation field 106 and operation_2 stored in operation field 107 of the two-operations instruction are executed in parallel by memory unit 3 and integer unit 4. In this case, a conflict can occur when one of the flag registers in flag field 180 is to be updated by both instructions executed in parallel in memory unit 3 and integer unit 4. In order to avoid such a conflict, the update of the flag by integer unit 4 prevails over memory unit 3 by the arbitration operation of the predetermined priority by arbitration unit 50 in microprocessor 1. The priority of flag update is not limited to this style. For example, the priority may be determined between memory unit 3 and integer unit 4 according to the number of instructions that can be executed by each unit, for example. When the executable number of instructions is equal between both units, either unit can be set the higher priority. When the executable number of instructions is not equal, the unit that has more executable number of instructions can be set the higher priority.

The order of priority of flag update is set forth in the following. Consider the case where integer unit 4 has a higher priority than memory unit 3 and flag access a conflict occurs. After the flag is updated by an instruction at the integer unit 4 end, an attempt of the flag update by an instruction at the memory unit 3 end will be rejected. The content of the prior update is set valid, and the flag will not be rewritten by a subsequent update (the subsequent update content will be made invalid).

FIG. 7 shows a portion of an algorithm represented using the instruction notation according to microprocessor 1 of the first embodiment. The high-level language corresponding to a section of a certain algorithm is transformed into a sequence of instructions as shown in FIG. 7 by a compiler. Then, the assembler combines the execution sequence of the instructions between memory unit 3 and integer unit 4 so as to utilize the two-operations instruction on the basis of a sequence of instructions represented without being aware of the two-operations instruction as shown in FIG. 7. This process by an assembler is required in optimizing a sequence of instructions as shown in FIG. 7 generated by the compiler upon input of a program (algorithm) described by a high-level language or an assemble program that is not optimized sufficiently, i.e., in optimizing an assembler program that is not furnished to circumvent a conflict associated with update of flags according to a two-operations instruction.

Such an optimization feature is called "packing". In an assembler corresponding to the hardware structure of the present embodiment, packing is realized as a part of the feature. Alternatively, the programmer can effect packing manually taking into consideration the difference in the hardware structure.

Figure 8:
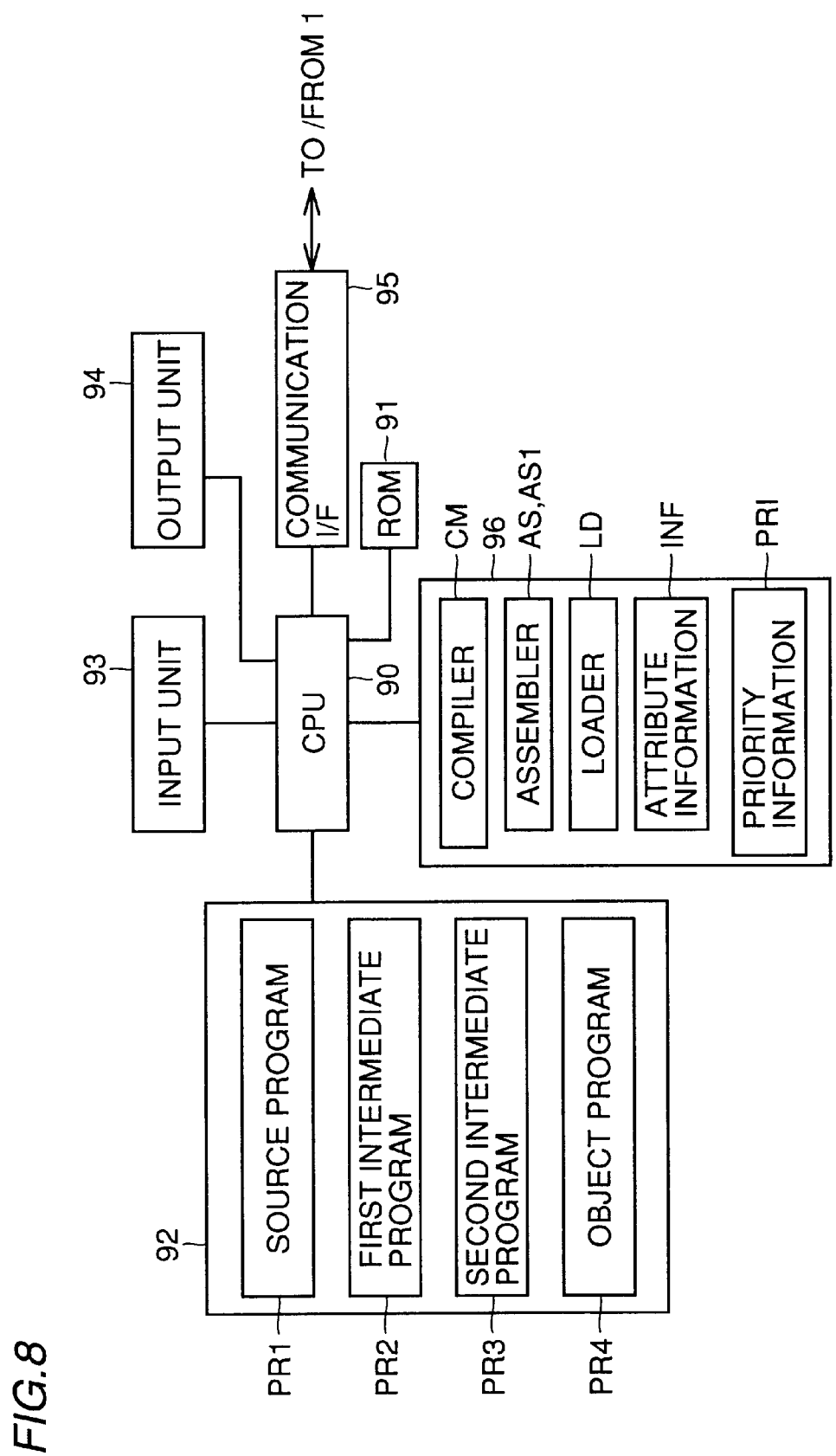
FIG. 8 shows the hardware environment in producing a program loaded to the microprocessor of the first embodiment.

FIG. 8 shows a hardware environment for producing a program that is loaded to microprocessor 1 of the first embodiment. This hardware environment is offered by, for example, a simple work station. The work station includes a CPU 90, a ROM 91, a RAM 92, an input unit 93 such as the keyboard, an output unit 94 such as the printer and the display, a communication I/F (interface) 95 to communicate with an external apparatus such as microprocessor 1 of FIG. 1, and an HD (hard disk) 96.

HD96 has a file system registered. This file system includes a compiler CM, an assembler AS or an extended assembler AS1 which is an extended version of assembler AS, a loader LD, and attribute information INF and priority information PRI that will be described afterwards to produce a program that is loaded to microprocessor 1.

Figure 9:
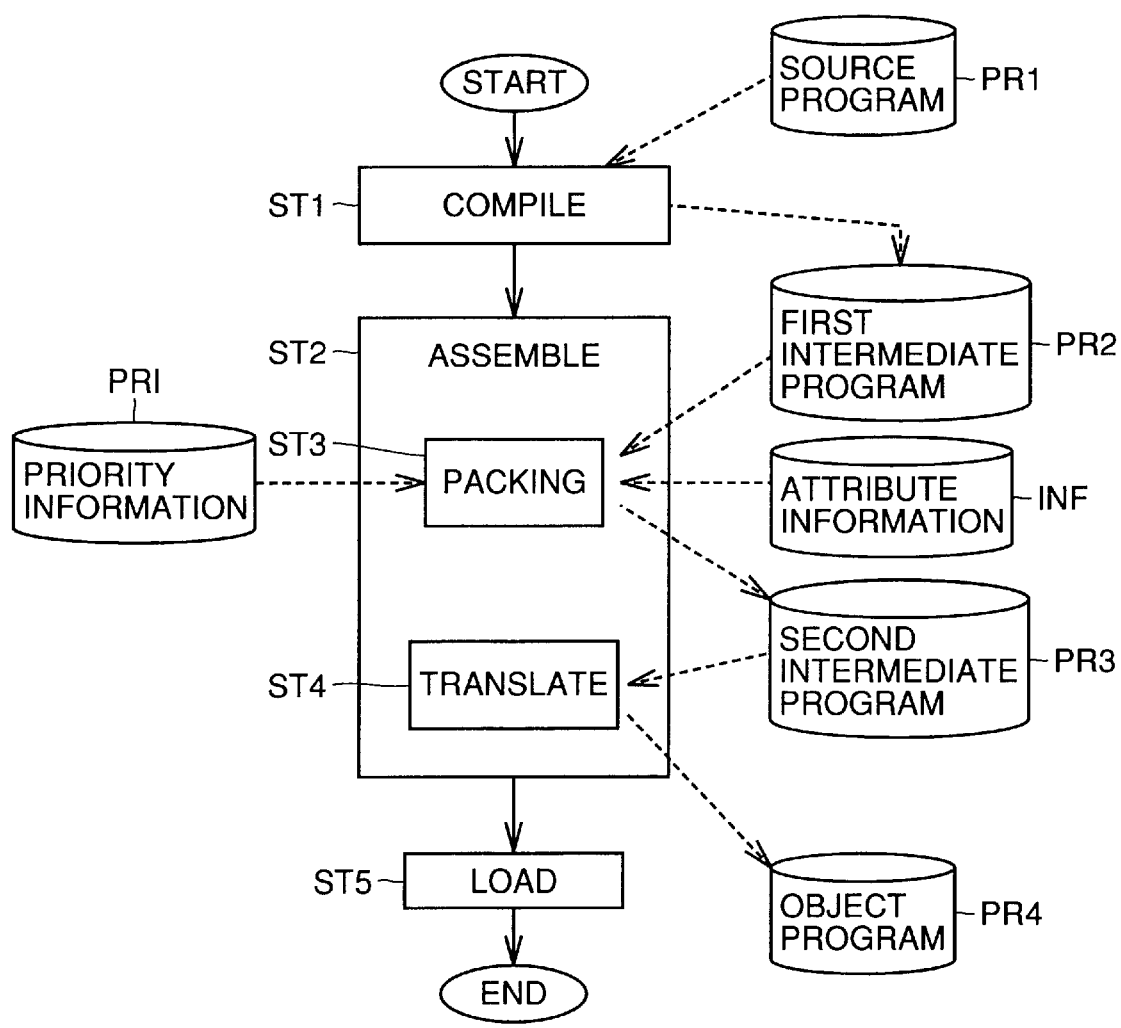
FIG. 9 shows the procedure of producing a program loaded to the microprocessor of the first embodiment.

FIG. 9 shows the procedure of producing a program loaded to microprocessor 1 of a first embodiment. Upon entry of a source program PRI described by a high-level language through input unit 93 of FIG. 8, the program is compiled by compiler CM to be transformed into a first intermediate program PR2 (step ST1) in which the instructions are arranged in the execution order in the assembly language. Then, first intermediate program PR2 is assembled by assembler AS or extended assembler AS1 (step ST2). More specifically, assembler AS or extended assembler AS1 carries out the above-described packing process (step ST3) as the preprocess, and carries out transformation (step ST4) as the post process. In a packing process, first intermediate program PR2 is converted into a second intermediate program PR3 to allow parallel execution of the instructions while avoiding a conflict. In the transformation process, second intermediate program PR3 is stored in instruction RAM 6 of FIG. 1 and transformed into an object program PR4 described in the machine language that can be executed by microprocessor 1. Object program PR4 is loaded to instruction RAM 6 in microprocessor 1 through communication I/F 95 by loader LD (step ST5). Extended assembler AS1 will be described afterwards in the fifth embodiment.

Programs PR1–PR4 are stored in RAM 92 shown in FIG. 8. Priority information PRI specifies whichever of units 3 and 4 is permitted with priority of access of the flag in PSW storage register when a conflict occurs during parallel execution of instructions by units 3 and 4. Priority information PRI is prestored in a file according to the structure of microprocessor 1 to be referred to. Priority information PRI can be input through input unit 93 of FIG. 8 as a parameter (option) during execution of the assembler. It can be set in a program of the assembler.

Figure 10:
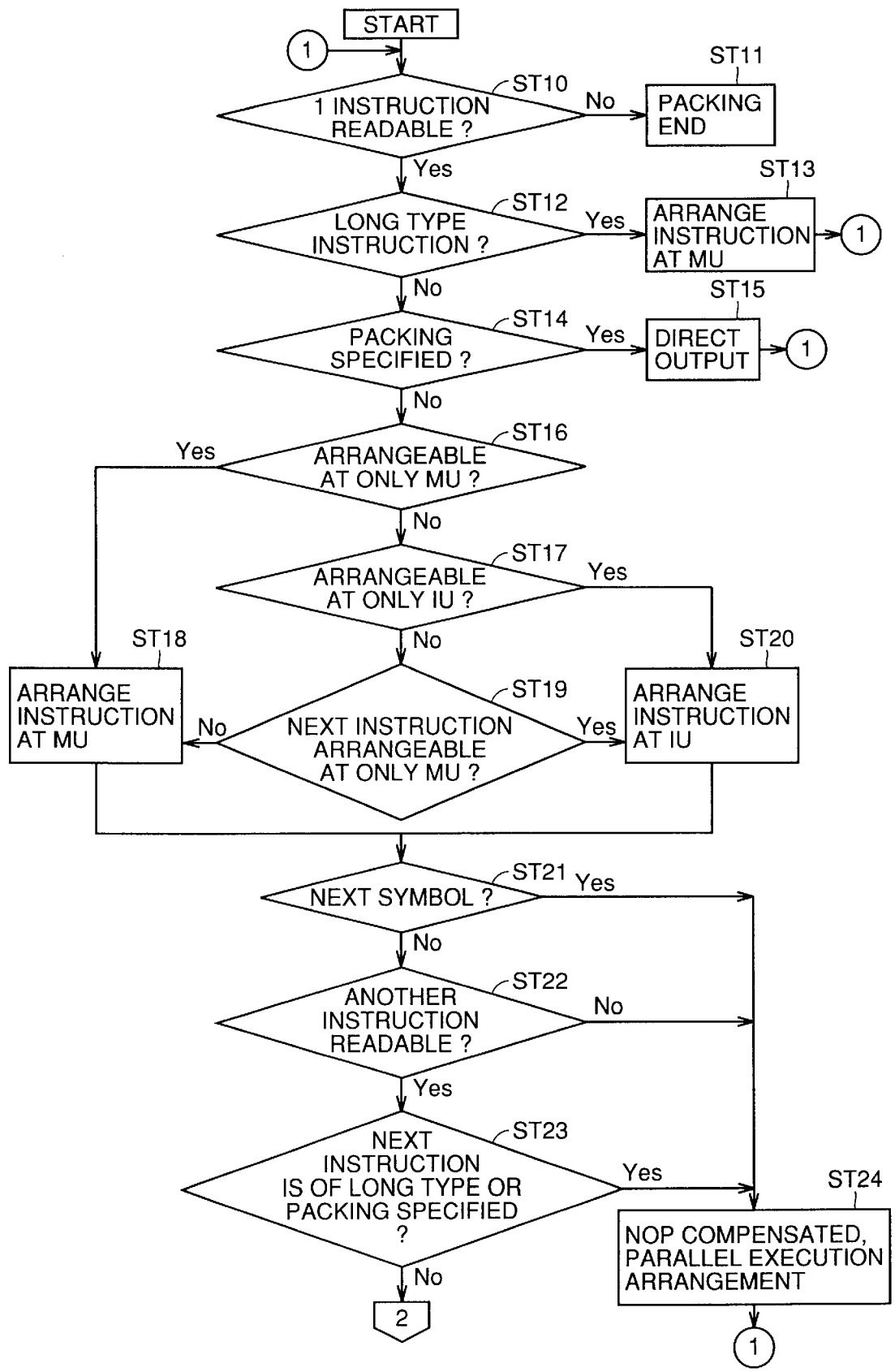
FIGS. 10 and 11 are packing flow charts of an assembler AS of the first embodiment corresponding to the hardware structure of FIG. 1.
Figures 11, 12:
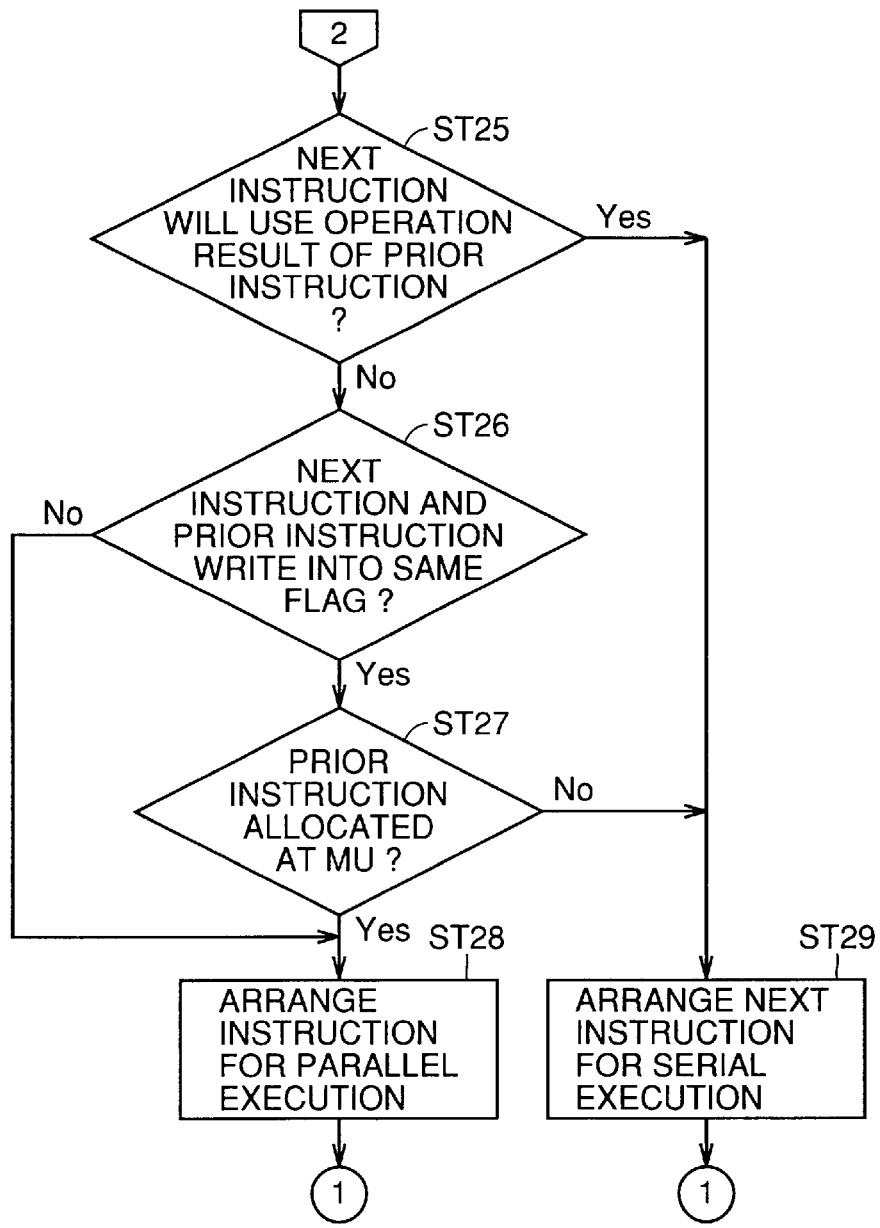
FIG. 12 shows a second intermediate program PR3 which is the packing result according to the flow charts of FIGS. 10 and 11 with a first intermediate program PR2 of FIG. 7 as the input data.

FIGS. 10 and 11 are flow charts of packing corresponding to the hardware structure of FIG. 1 for assembler AS according to the first embodiment. In the flow charts, memory unit 3 is denoted as "MU" and integer unit 4 is denoted as "IU".

FIG. 12 shows a second intermediate program PR3 which is the result of the packing procedure according to the flow charts of FIGS. 10 and 11 with first intermediate program PR2 of FIG. 7 as the input data. The packing procedure of entering intermediate program PR2 and transforming the same into intermediate program PR3 of FIG. 12 will be described hereinafter with reference to the flow charts of FIGS. 10 and 11.

In the flow charts of FIGS. 10 and 11, the instruction sequence read in from first intermediate program PR2 is arranged at either the left side or the right side of the symbol of code FM as shown in FIG. 12. In this case, the process proceeds so that the read instruction sequence is arranged at the left side as the default. The left side instruction implies the instruction executed at the MU side and the right side instruction implies the instruction executed at the IU side.

The content of a certain line in first intermediate program PR2 of FIG. 7 is read in (step ST; step omitted hereinafter). If there is no content to be read in and reading cannot be effected, the packing ends (ST11).

When an instruction code is read in, determination is made whether that instruction code is the long type instruction of FIG. 3H or FIG. 3I (ST12). Determination of a long type instruction code is made when the third operand corresponding to that instruction code is an intermediate value, and there is a possibility that the code cannot be represented in the short form. The relevant instruction code and the operand are arranged at the MU side, i.e., leftwards to the symbol of code FM in FIG. 12 (ST13).

When the code can be represented by the short format even if the third operand is an intermediate value, or when the operand is a register, determination is made of a short type instruction code (NO at ST12). If packing is not specified (NO at ST14), the program proceeds to the next process (ST16), otherwise (YES at ST14) the instruction code is directly output (ST15). Then, the program returns to the process of ST10. Specification of packing implies that a line in second intermediate program PR3 is specified.

Most of the instruction codes executed by microprocessor 1 can be arranged at either side of MU or IU. However, there are some instruction codes that have their arrangement limited to only the MU side or the IU side. Therefore, each instruction code that is the subject of execution in microprocessor 1 has an attribute preassigned indicating the information of whether the instruction code is arrangeable at only the MU side, at only the IU side, or at either sides. Assembler AS shown in FIG. 9 refers to attribute information INF in which this attribute is recorded for each instruction code to determine the arrangement of each read information code at either the MU or IU side.

When determination is made that the read instruction code is arrangeable at only the MU side (YES at ST16), the relevant instruction code and the corresponding operand are arranged at the MU side (ST18). When determination is made that the instruction code can be arranged at only the IU side (YES at ST17), the relevant instruction code and the corresponding operand are arranged at the IU side (ST20). When determination is made that arrangement at either side is allowed (NO at ST16 and ST17), the attribute of the next instruction code in first intermediate program PR2 is referred to. When the attribute indicates that the instruction code is arrangeable at only the MU side (YES at ST19), the previous read instruction code and corresponding operand are arranged at the IU side (ST20), otherwise (NO at ST19), the previous read instruction code and the operand are arranged at the MU side which is the default (ST18).

When the next content is read in from first intermediate program PR2 and it is a symbol indicating a label such as a subroutine name (YES at ST21), the NOP instruction is arranged at the MU or IU side whichever is empty. Arrangement is provided so that two instructions can be executed in parallel (ST24).

When the next read content is not a symbol (NO at ST21), determination is made whether another instruction code can be read in or not. When determination is made that an instruction code cannot be read in (NO at ST22), the program proceeds to the process of (ST24). Then, the program returns to ST10 to repeat a likewise process.

When determination is made that an instruction code can be read in (YES at ST22), the program proceeds to ST23. When the next instruction code is of the long type or when packing is specified (YES at ST23), the above-described process of ST24 is carried out. Then, the program returns to the process of ST10 to repeat a likewise process. When the next instruction code is not of the long format and packing is not specified (NO at ST23), determination is made whether that readable next instruction code is to be executed using the operation result of the previously read instruction code (ST25). Determination is made that parallel execution is unfeasible if the second or third operand corresponding to the next read in instruction code uses the first operand (the operand in which the operation result is to be stored)

corresponding to the previously read instruction code. Otherwise, determination is made that parallel execution is possible.

When determination is made that parallel execution is unfeasible (YES at ST25), both instruction codes are arranged in respective fields in the same packet (ST29) so that the next instruction code is executed with the corresponding operand serially after execution of the previously read instruction code. When determination is made that parallel execution is allowed (NO at ST25), determination is made whether a conflict occurs as to flag update when the previously read instruction code and the next read instruction code are executed in parallel (ST26). When determination is made that a conflict does not occur (NO at ST26), both instruction codes are arranged in respective fields of the same packet (ST28) so that the next read instruction code is executed parallel with the previously read instruction code. Then, the program returns to ST10 to repeat a likewise process.

When determination is made that a conflict occurs (YES at ST26), determination is made whether the previously read instruction code and the next read instruction code can be arranged according to the priority information PRI written in the flag to avoid a conflict (ST27). When determination is made that arrangement can be made (YES at ST27), both instruction codes are arranged in respective fields in the same packet (ST28) so that the next read instruction code is executed parallel with the previously read instruction code. When determination is made that arrangement is unfeasible (NO at ST27), both instruction codes are arranged in respective fields of the same packet according to the priority information PRI so that the next read instruction code will be executed serially after execution of the previously read instruction code to maintain operation logic (ST29). A likewise process is repeated thereafter.

By a packing process through assembler AS as described above, intermediate program PR2 as shown in FIG. 7 is transferred into second intermediate program PR3 as shown in FIG. 12.

When second intermediate program PR3 is loaded to instruction RAM 6 of processor 1, the program is transferred into an object program PR4 represented in a machine language of a pattern of 0,1 by the postprocess of assembler AS. Object program PR4 is loaded to instruction RAM 6 through communication I/F 95 of FIG. 8 by loader LD.

Figure 13:
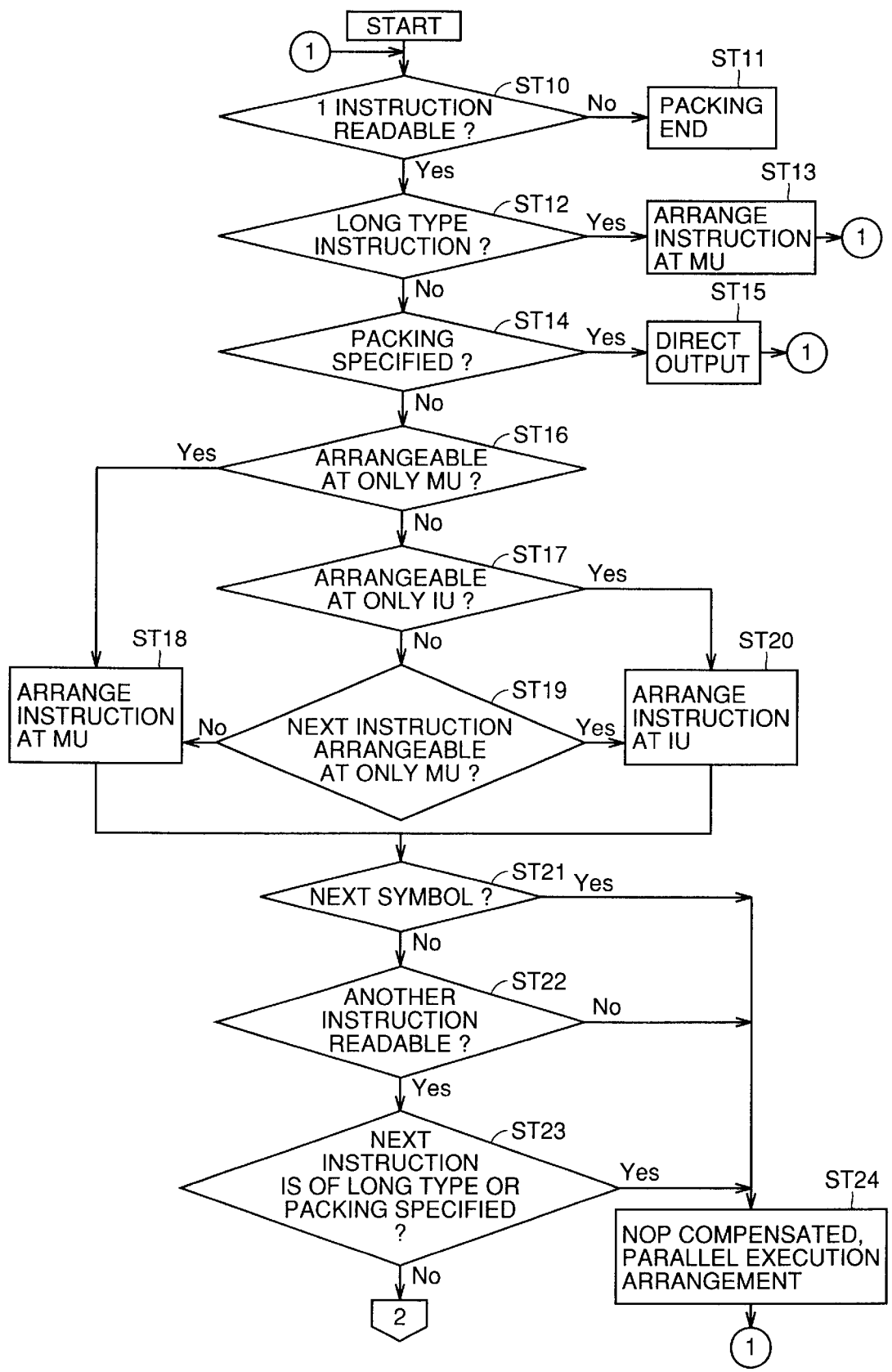
FIGS. 13 and 14 are packing flow charts corresponding to the hardware structure when the flag write priority was not specified.
Figures 14, 15:
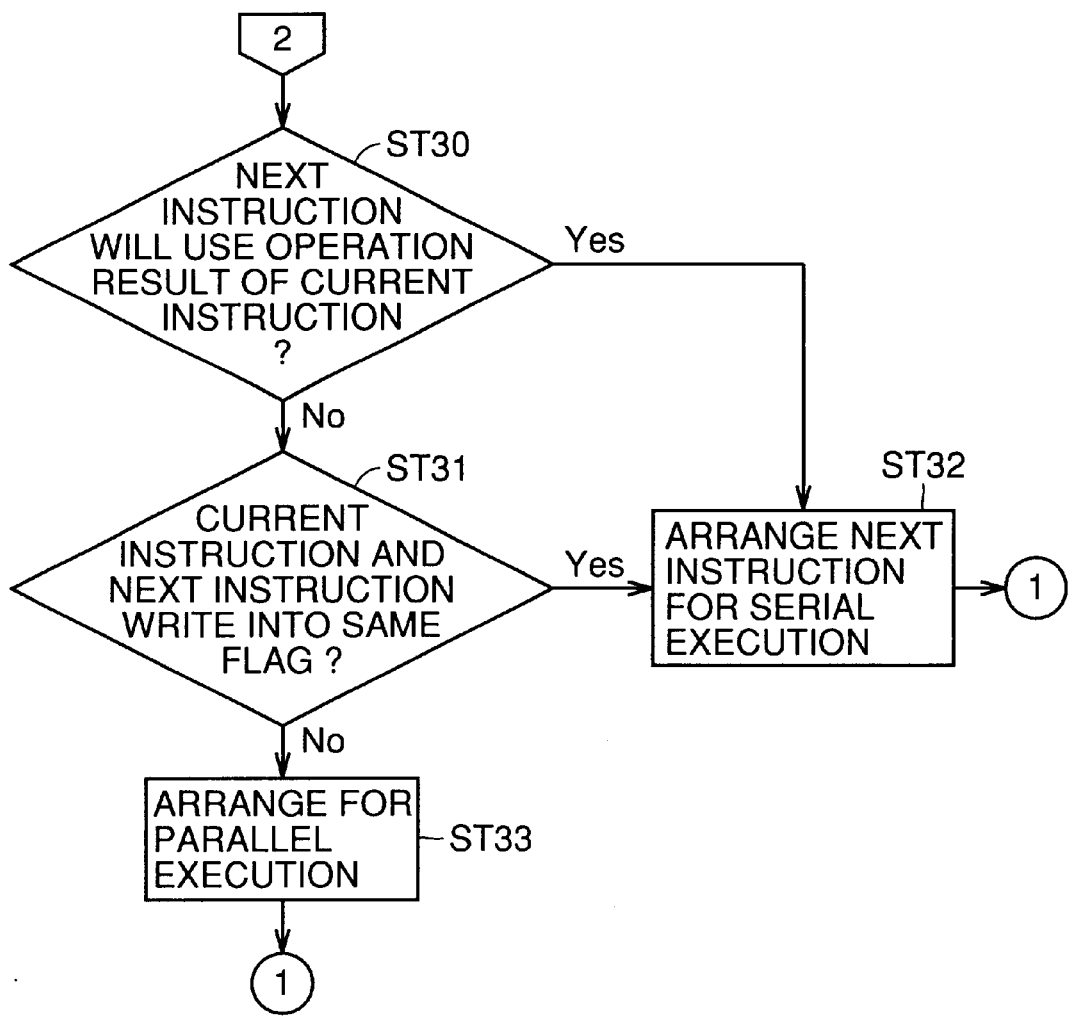
FIG. 15 shows the result of packing first intermediate program PR2 of FIG. 7 according to the flow charts of FIGS. 13 and 14.

FIGS. 13 and 14 are the packing flow charts corresponding to a hardware structure when the flag writing priority is not set. FIG. 15 shows the packing result of first intermediate program PR2 of FIG. 7 according to the flow charts of FIGS. 13 and 14.

The flow charts of FIGS. 13 and 14 differ from the flow charts of FIGS. 10 and 11 in that steps ST30–ST33 are provided instead of steps ST25–ST29 of FIG. 11. The process of FIG. 13 is similar to that of FIG. 10. Therefore, description thereof will not be repeated. The process of FIG. 14 merely adjusts the instruction execution sequence so that instructions that cause a conflict as to flag update are not executed in parallel in the process of step ST31. According to the previous flow chart of FIG. 11, the flag update priority is set between the MU and the IU, and instructions arranged according to that setting. In the procedure of FIG. 14, adjustment of the execution sequence to avoid a conflict is not required. Therefore, the number of program steps can be reduced.

Since the program must be executed so as to avoid a conflict as to flag writing according to the flow charts of FIGS. 13 and 14, the number of times of executing the instruction as shown in FIG. 15 simultaneously is reduced by one time in comparison to the case of FIG. 12. As to the execution time of the same program PR2, the procedure by FIG. 15 is longer by one unit time than the procedure by FIG. 12.

It is appreciated from the difference between FIGS. 12 and 15 that, by employing a hardware structure in which the priority of flag writing between the MU and IU is set and a corresponding packing process of assembler AS, the operation performance is improved by the present embodiment than the conventional one even when the same program is to be executed.

The information of priority set between memory unit 3 and integer unit 4 as to flag update is set in arbitration unit 50 at the hardware assembling level of microprocessor 1. As shown in FIG. 9, the assembler is implemented so as to refer to information PRI associated with the priority at the time of packing as data in advance.

Second Embodiment

Figure 16:
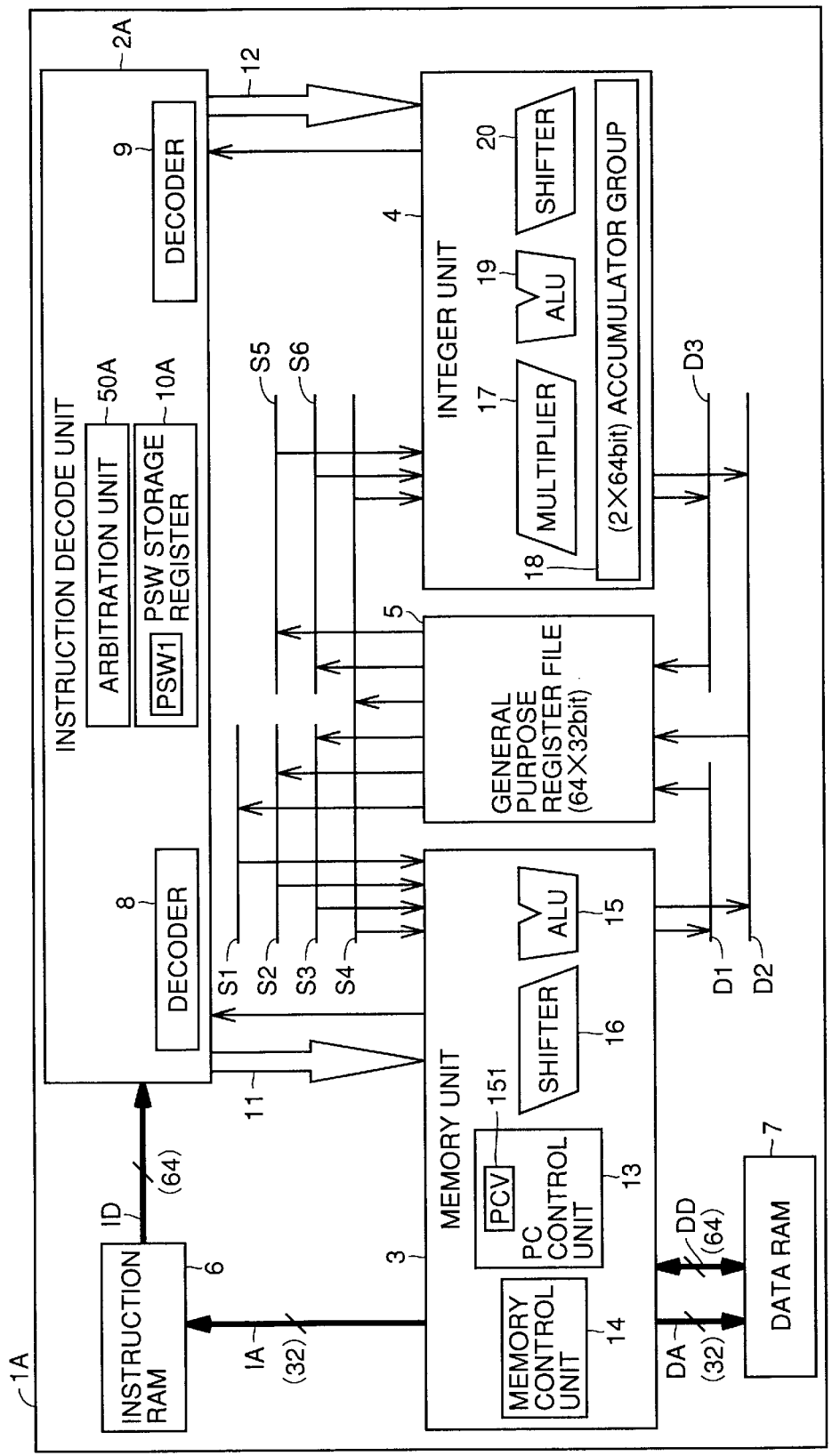
FIG. 16 is a block diagram showing a structure of a microprocessor according to a second embodiment of the present invention.

FIG. 16 shows a structure of a microprocessor 1A according to a second embodiment of the present invention. Microprocessor 1A of FIG. 16 differs from microprocessor 1 of FIG. 1 in that an instruction decode unit 2A is provided instead of instruction decode unit 2. Instruction decode unit 2A includes a PSW storage register 10A storing PSW1 and an arbitration unit 50A instead of PSW storage register 10 and arbitration unit 50. The remaining structure of microprocessor 1A is similar to that of microprocessor 1. Therefore, description thereof will not be repeated. Memory unit 3 and integer unit 4 access PSW1 in PSW storage register 10A via arbitration unit 50A.

Figure 17:
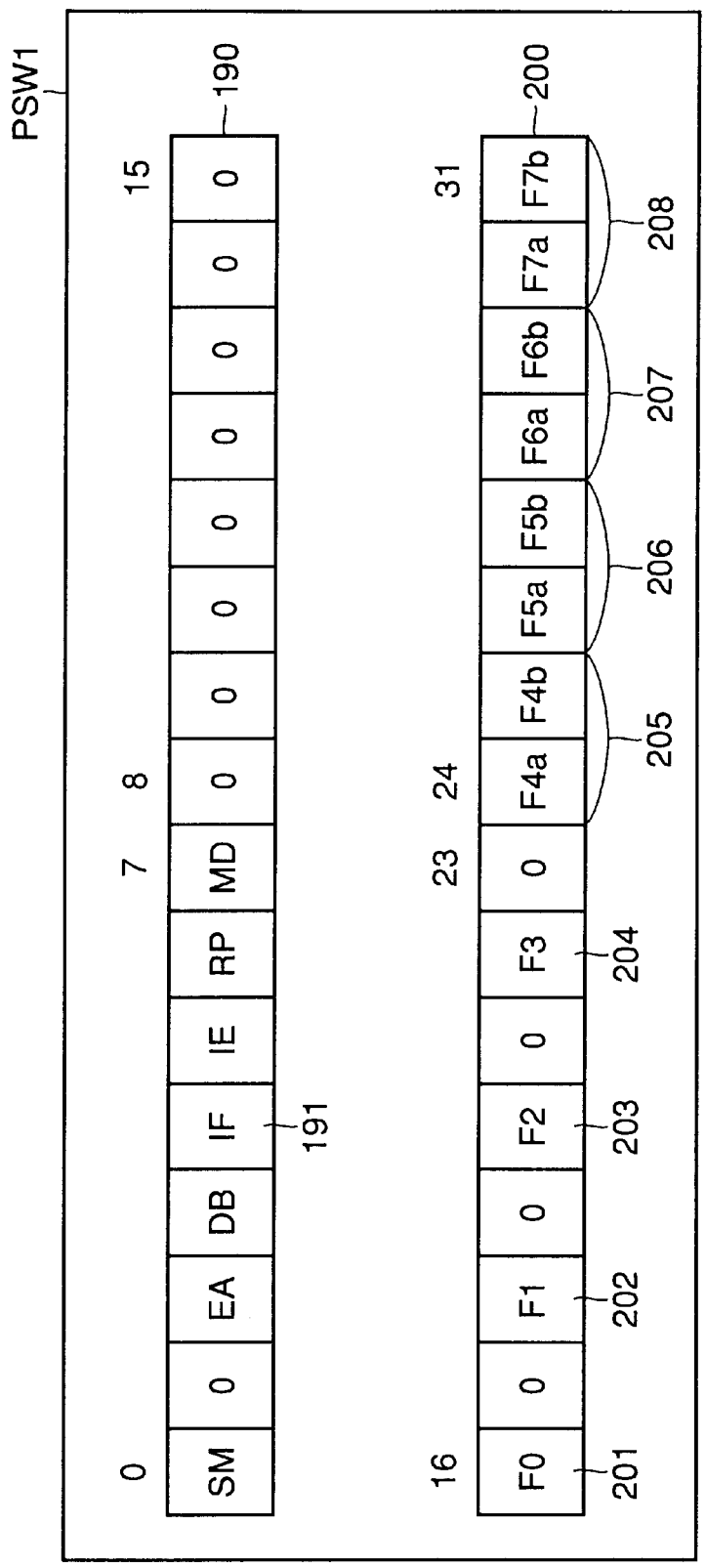
FIG. 17 shows in detail the content of PSW1 applied to the second embodiment.

FIG. 17 shows in detail the content of PSW1 used in the second embodiment. A field 190 corresponding to the more significant 16 bits of PSW1 stores a flag IF at the fourth bit field 191 in addition to the contents of field 170 of the PSW of FIG. 5. A lower field 200 of the less significant 16 bits includes fields 201 and 202 storing execution control flags F0 and F1, respectively, fields 203 and 204 storing general purpose flags F2 and F3, respectively, and fields 205–208 storing respective flags. Lower field 200 is referred to as flag field 200 hereinafter.

Field 205 of flag field 200 stores saturation operation flags F4$a$ and F4$b$ corresponding to integer unit 4 and memory unit 3, respectively. Field 206 stores overflow flags F5$a$ and F5$b$ corresponding to integer unit 4 and memory unit 3, respectively. Field 207 stores accumulated overflow flags F6$a$ and F6$b$ corresponding to integer unit 4 and memory unit 3, respectively. Field 208 stores carry/borrow flags F7$a$ and F7$b$ corresponding to integer unit 4 and memory unit 3, respectively. These flags are accessed individually by respective instructions executed by a corresponding unit. The execution result of an instruction is held therein.

Flag IF of field 191 is defined as set forth in the following.

IF=0: flag is shared by integer unit 4 and memory unit 3.

More specifically, operation is implemented so that the lower 8 bits of PSW1 of FIG. 17 takes an organization identical to the lower 8 bits of flag field 180 of the PSW of FIG. 15. In other words, flags F4$b$, F5$b$, F6$b$ and F7$b$ become inactive.

IF=1: dedicated flags are used for each of integer unit 4 and memory unit 3.

In other words, flags F4$b$, F5$b$, F6$b$ and F7$b$ of FIG. 10 become active. All the contents of fields 200–208 become valid.

Thus, control is provided so that arbitration unit 50A uses respective dedicated flags of integer unit 4 and memory unit 3 when flag IF=1. A conflict associated with flag update is avoided when instructions of modifying the flag are executed simultaneously by memory unit 3 and integer unit 4. When flag IF=0, a structure equivalent to the previous first embodiment is implemented by the arbitration of arbitration unit 50A according to the value of flag IF. Therefore, flag update by integer unit 4 is given priority to avoid a conflict of flag update, as in the first embodiment. Since the value of flag IF in field 191 can be modified by the software similar to the other fields of PSW1, a mode suitable to the feature of the executed program can be selected.

FIG. 18 shows an example representing a section of an algorithm using the instruction notation of microprocessor 1A of the second embodiment. The instruction execution sequence of integer unit 4 and memory unit 3 are combined by the assembler according to the algorithm so that the two-operations instruction is utilized.

FIG. 19 shows a sequence of instructions executed by memory unit 3 and integer unit 4 when the instruction sequence of FIG. 18 is executed in the shortest time. FIG. 19 shows the time series T of the instructions executed by memory unit 3 and integer unit 4 when flag IF=1. In FIG. 19, the NOP instruction is added conveniently for the sake of simplification. In practice, an instruction (not shown) arranged immediately after or before the instruction sequence of FIG. 18 is appropriately executed.

FIG. 20 shows an instruction sequence executed by memory unit 3 and integer unit 4 when the instruction sequence of FIG. 18 is executed in the shortest time. FIG. 20 shows an instruction sequence of the shortest execution time when flag IF=0. Since programming is required so that flag update a conflict does not occur when flag IF=0, the execution time becomes longer by one unit time than that of FIG. 19. It is appreciated from FIGS. 19 and 20 that the operation performance is improved by providing dedicated flags in PSW1 for memory unit 3 and integer unit 4 as to the example of the program of FIG. 18.

FIG. 21 shows an example realizing a portion of another algorithm using the instruction notation of microprocessor 1A of the second embodiment. FIGS. 22 and 23 show the time series of the instructions executed by memory unit 3 and integer unit 4 when the instruction sequence of FIG. 21 is executed in the shortest time. Since dedicated flags are retained in PSW1 for each of memory unit 3 and integer unit 4 when IF=1, the programmer must compensate for the instruction so that the instructions of "ADD R1, R2, R3" are executed at both units. FIG. 23 shows the case where flag IF=0. Although the instruction execution cycle is similar to that of FIG. 22, the instruction (not shown) located immediately before the instruction sequence of FIG. 21 can be executed at time T indicated by instruction NOP. Therefore, the code size of the program is smaller for FIG. 23 than for FIG. 22. Also, the execution time of the entire program may be reduced.

Thus, the operation mode of flag IF=1 is valid for the program of FIG. 18 whereas the operation mode of flag IF=0 is valid for the program of FIG. 21.

Since the switch between a mode of sharing the flag in PSW1 by memory unit 3 and integer unit 4 and a mode of assigning a flag individually for units 3 and 4 by using flag IF can be selected arbitrarily according to the content of the program executed by microprocessor 1A, the operation performance is improved. A similar advantage can be achieved according to a structure of a processor that allocates a dedicated flag for each unit fixedly without mode switching.

Third Embodiment

Figure 24:
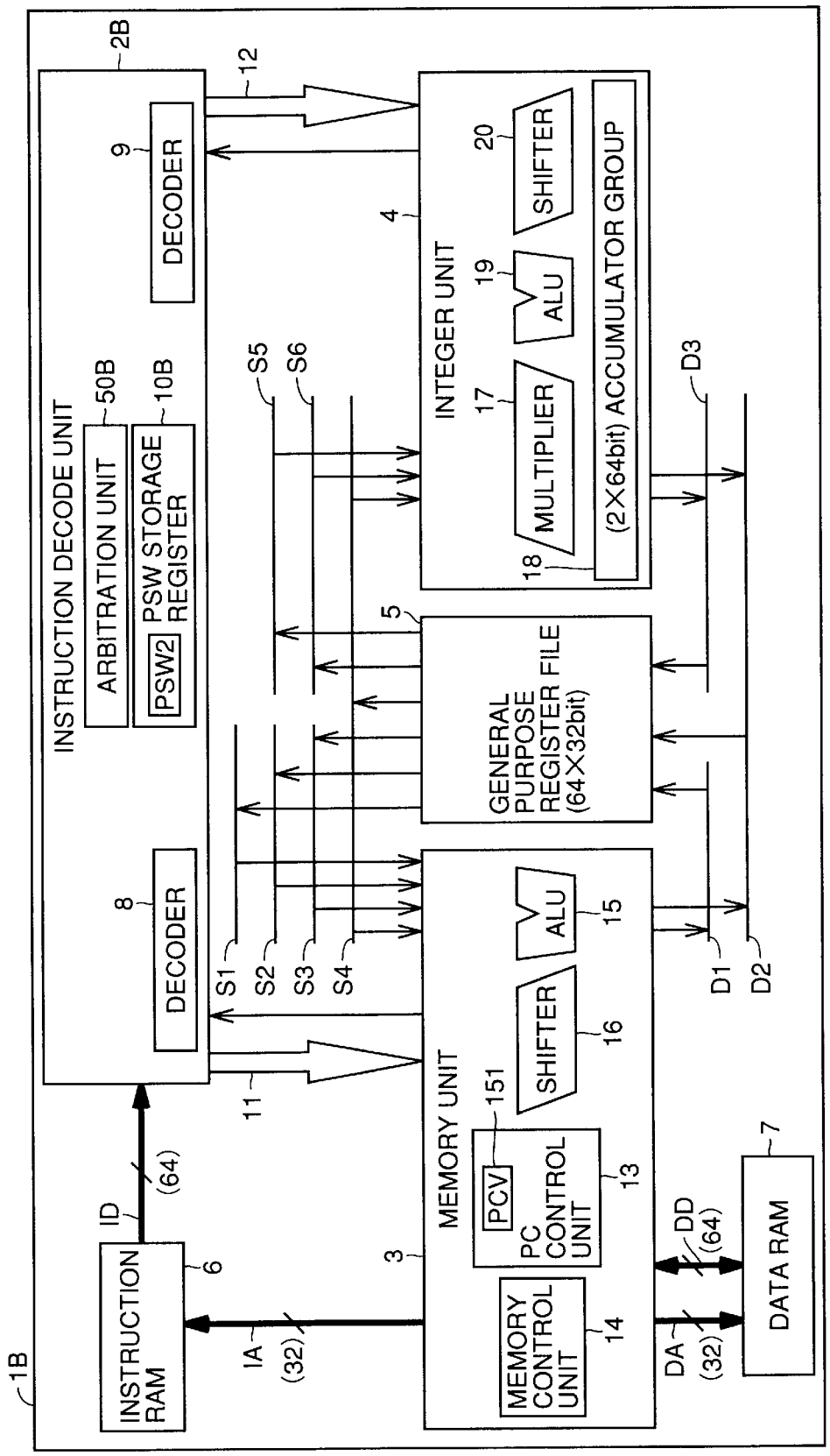
FIG. 24 is a block diagram showing a structure of a microprocessor according to a third embodiment of the present invention.

FIG. 24 shows a structure of a microprocessor 1B according to a third embodiment of the present invention. Microprocessor 1B has a structure similar to that of microprocessor 1 for the exception that an instruction decode unit 2B is included instead of instruction decode unit 2 of microprocessor 1 of FIG. 1. Instruction decode unit 2B includes a decoder 8, a PSW storage register 10B storing a PSW (Processor Status Word) 2 indicating the status of the processor, a decoder 9, and an arbitration unit 50B operating likewise arbitration unit 50A. Memory unit 3 and integer unit 4 access PSW2 in PSW storage register 10B via arbitration unit 50B.

The contents of PSW2 employed in the third embodiment will be described hereinafter.

The third embodiment shows the operation in the event that a SIMD (Single Instruction Multiple Data) is included in the instruction group executed by microprocessor 1B. In the SIMD instruction, the same process is applied on a plurality of input data at one instruction execution. When the computed result exceeds a predetermined maximum value of data in a multimedia process to which the SIMD instruction is applied, i.e. when overflow occurs, the computed result is automatically converted to the largest value of the processable range in microprocessor 1B.

Referring to FIG. 24, PSW2 includes a field 210 corresponding to the upper 16 bits and a field 220 corresponding to the lower 16 bits. PSW2 differs from PSW1 of FIG. 17 in that fields 211–214 storing flags are included at the eighth to fifteenth bits of field 210 of PSW2. The remaining structure is similar to that of PSW1. Fields 211–214 are used in an auxiliary manner when a 2-way SIMD instruction (higher and lower half-word instructions) are executed.

Figure 25:
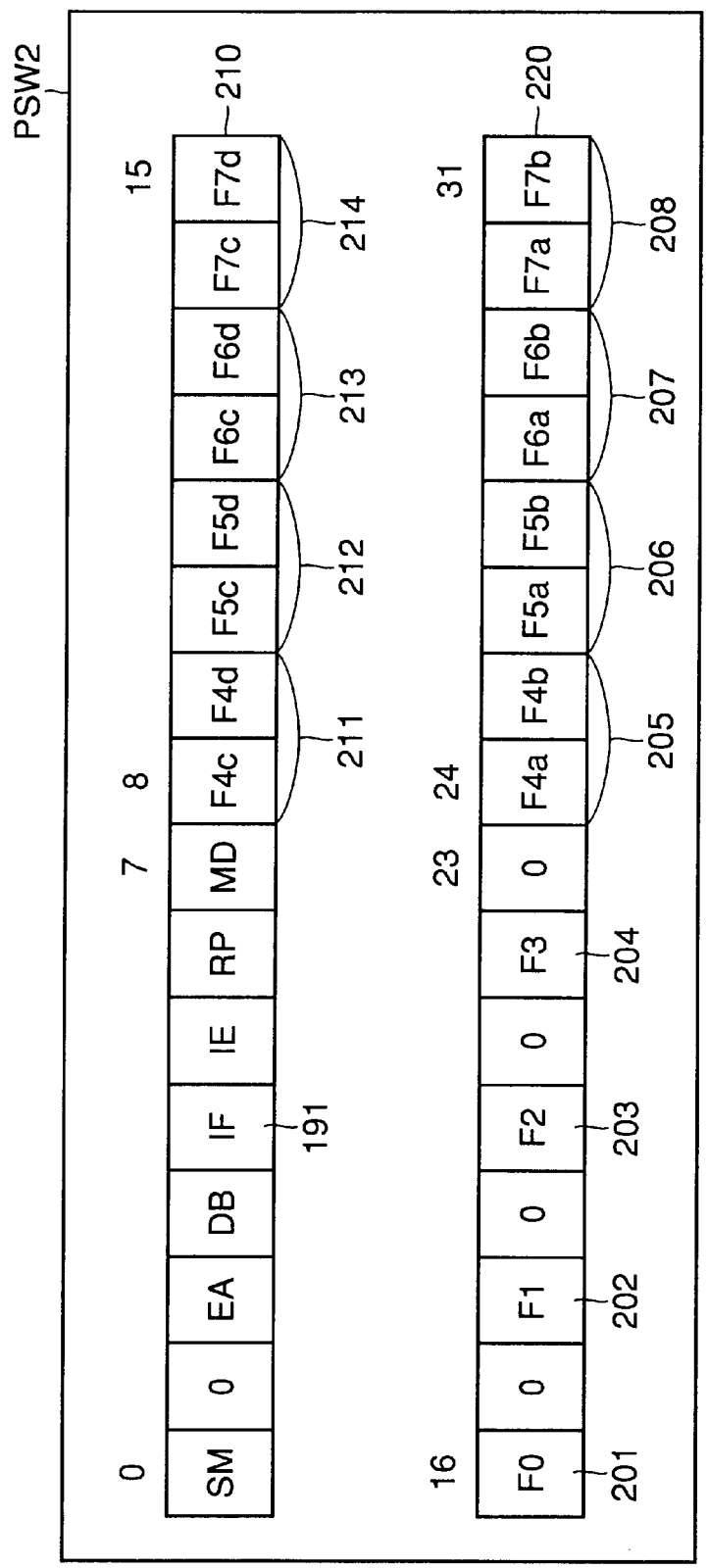
FIG. 25 shows in detail the contents of PSW2 applied to the third embodiment.

Referring to FIG. 25, flags F4c and F4d of field 211 are saturation operation flags dedicated for the operation with respect to the higher half-word when a SIMD instruction is executed by integer unit 4 and memory unit 3. Flags F4a and F4b shown in the second embodiment maintain the result of the operation for the lower half-word.

Flags F5c and F5d of field 211, flags F6c and F6d of field 213, and flags F7c and F7d of field 214 are overflow flags, accumulated overflow flags and carry/borrow flags of the operation control of the higher half-word in the half-word operation. Flags F5a and F5b of field 206, flags F6a and F6b of field 207, and flags F7a and F7b of field 208 retain the result of the lower half-word operation in the execution of the SIMD instruction. Flags F5b, F5c, F5d, F6b, F6c, F6d, F7b, F7c and F7d are valid only when flag IF in field 191 is "1".

According to the hardware structure of the conventional case or of the second embodiment, only one overflow flag, for example, is allocated to each functional unit. This means that a result including occurrence of overflow when the SIMD instruction is executed cannot be retained. Only a program process that does not modify the flag is allowed when the SIMD instruction is executed. The specification of the program was absent of versatility.

In contrast, the structure of the third embodiment allows the result indicating occurrence of overflow to be retained with a flag for each half-word operation of the SIMD instruction. Therefore, the specification of a program using the SIMD instruction can be made more versatile. The SIMD instruction can be used in a wider application. The many development tools of the software can be offered by using microprocessor 1B.

FIG. 26 shows the operation specification of the ADD2H instruction used in the third embodiment of the present invention.

Fourth Embodiment

Figure 27:
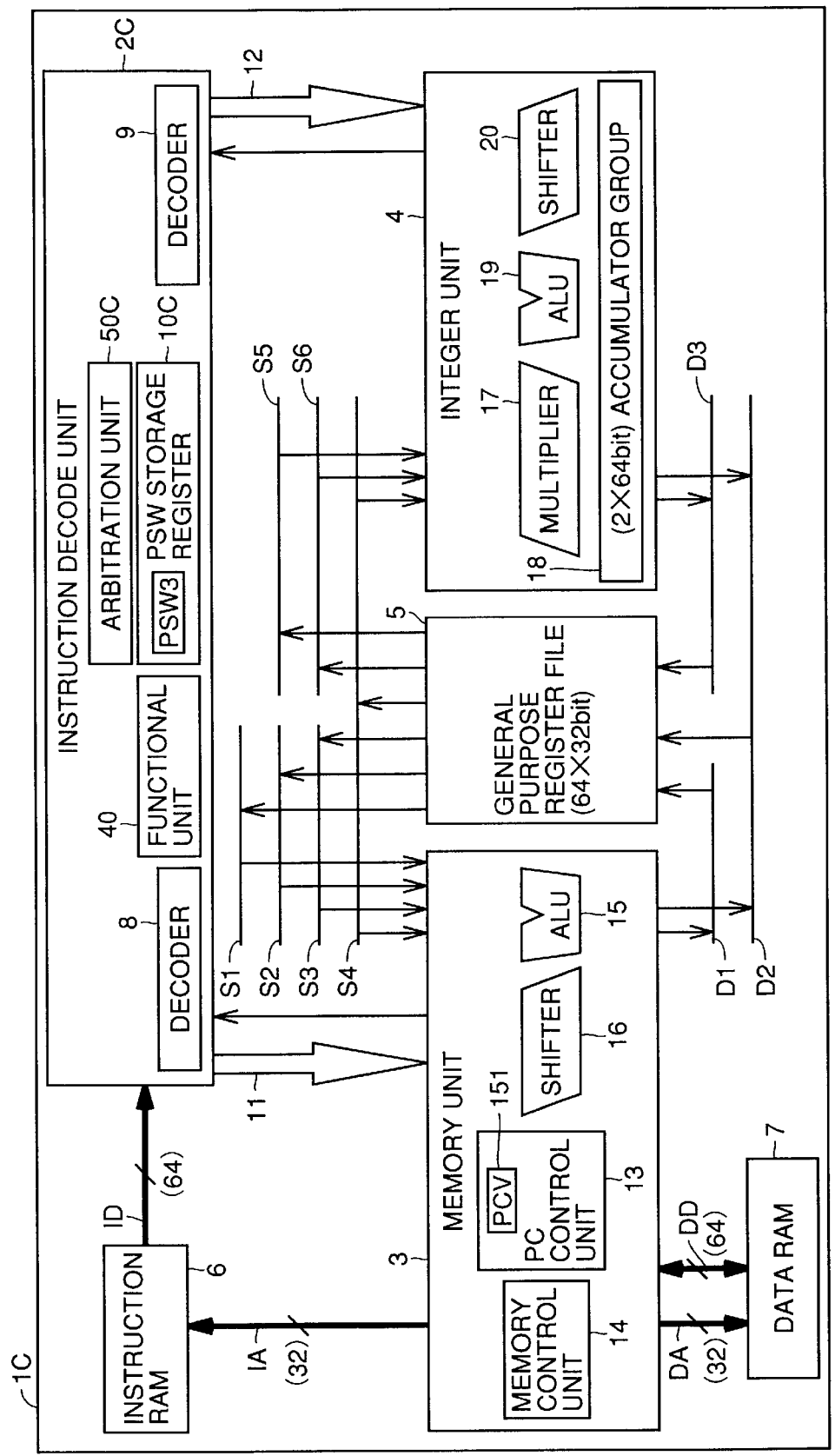
FIG. 27 is a block diagram showing a structure of a microprocessor according to a fourth embodiment of the present invention.

FIG. 27 shows a structure of a microprocessor 1C according to a fourth embodiment of the present invention. Microprocessor 1C of FIG. 27 differs from microprocessor 1 of FIG. 1 in that an instruction decode unit 2C is provided instead of instruction decode unit 2 of microprocessor 1. The remaining structure of microprocessor 1C is similar to that of microprocessor 1. Therefore, description thereof will not be repeated.

Instruction decode unit 2C includes decoders 8 and 9, a PSW storage register 10C storing a PSW3 indicating the state of the processor, a functional unit 40, and an arbitration unit 50C operating likewise arbitration unit 50B. Functional unit 40 carries out a predetermined operation process regarding at least one flag in PSW3. Memory unit 3 and integer unit 4 access PSW3 in PSW storage register 10C through arbitration unit 50C.

According to the fourth embodiment, at least one flag of PSW3 that is updated by the instruction execution of respective memory unit 3 and integer unit 4 is logically operated by functional unit 40. A flag retaining that logical operation result is provided in PSW3.

Figure 28:
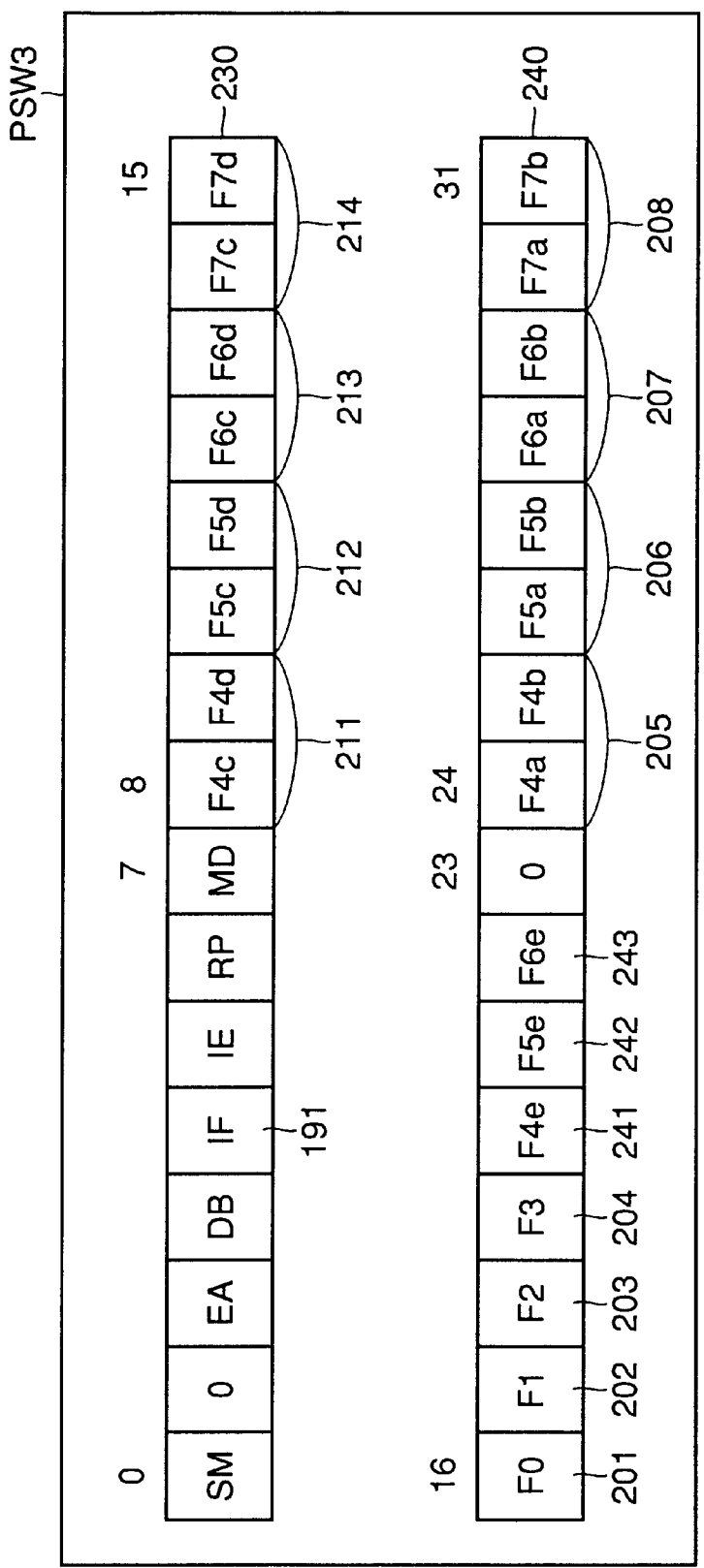
FIG. 28 shows the detailed content of PSW3 applied to the fourth embodiment.

FIG. 28 shows in detail the content of PSW3 used in the fourth embodiment. PSW3 includes a field 230 corresponding to the upper 16 bits and a field 240 corresponding to the lower 16 bits. PSW3 differs from PSW2 of FIG. 25 in that fields 201–204 and fields 241–243 are provided at the sixteenth to twenty third bits of field 240. The remaining contents are similar to those of PSW2. Referring to FIG. 28, fields 241–243 storing flags F4e, F5e and F6e are introduced in field 240. Fields 201–204 storing flags F0–F3 are shifted to the sixteenth to nineteenth bit, respectively. Flags F4e, F5e and F6e are valid only when flag IF=1 likewise the above-described flags F5b, F5c, F5d, F6b, F6c, F6d, F7b, F7c and F7d.

The XOR (exclusive OR operation) on the values from saturation operation flags F4a to F4d is carried out by functional unit 40. The computed result is retained in flag F4e. By referring to the value of flag F4e, determination can be easily made whether the number of times of the saturation operations actually carried out at the immediately preceding executed saturation operation instruction is an even number or an odd number to carry out a process according to the determination result.

Flag F5e retains the OR (logical sum) operation on the values in saturation flags F5a to F5d carried out by functional unit 40. By referring to the value of flag F5e, which of the immediately-preceding executed operations causes overflow can be easily identified.

Flag F6e retains the value of the OR Logical sum) operation on accumulated overflow flags F6a to F6d carried out by functional unit 40. By referring to the value of flag F6e, the timing of overflow occurrence can be easily detected during the period from the previous clearance of accumulated overflow flags F6a and F6d until execution of the immediately preceding instruction.

The provision of flags F4e, F5e, F6e allows the detection of the global execution status of the operation executed by microprocessor 1C including a plurality of functional units such as memory unit 3 and integer unit 4 without any particular post process. Therefore, the program size can be reduced and the content of the program simplified.

FIG. 29A and FIG. 29B show a second object program PR3 used in the fourth embodiment. Second object program PR3 corresponds to the process of branching to an error processing routine when overflow is detected in the operation of microprocessor 1C. FIG. 29A and FIG. 29B show the case where flag F5e is used and not used, respectively. It is appreciated that the processing time can be reduced for the case where flag F5e is employed in the processing program of detecting overflow in the operation. Specification of code CC in field 105 of FIGS. 29A and 29B is represented as follows.

CC=000 (no Notation)
    001/tx
    010/fx
    011/xt
    100/xf
    101/tt
    110/xf

Fifth Embodiment

The fifth embodiment of the present invention shows an assembler AS1 used by microprocessor 1A of the second embodiment. Assembler AS1 generates an instruction sequence to modify the operation mode of microprocessor 1A when a pseudo instruction is specified in source program PR1 which is executed by microprocessor 1A, and simultaneously switches between the packing for the shared flag mode and the packing for the discrete flag mode. Here, the flag operation mode includes a shared flag mode and a discrete flag mode. The shared flag mode is a mode sharing the flags of PSW1 between memory unit 3 and integer unit 4. The discrete mode is a mode having dedicated flags of PSW1 provided for memory unit 3 and integer unit 4.

In microprocessor 1A having the hardware structure shown in the second embodiment, consistency must be established between the specified flag operation mode and the packing method by the assembler. In the present embodiment, assembler AS is extended to allow specification of a macro instruction (pseudo instruction) that "generates an instruction group that modifies the flag operation mode, and simultaneously modifies the operation mode for packing". Such an extended assembler is called extended assembler AS1 hereinafter.

The macro instruction is specified as ".mode shared_flag" when modified to the shared flag mode and as ".mode dedicated_flag" when modified to the discrete flag mode. They are expanded into an instruction sequence of clearing (0) or setting (1) code IF in PSW1 of FIG. 17 by execution assembler AS1.

FIGS. 30A and 30B show the macro instruction to specify a flag operation mode according to the fifth embodiment, and an instruction sequence which is an expanded version thereof. FIG. 30A shows a macro instruction to specify a shared flag mode and an instruction sequence generated by expansion thereof. FIG. 30B shows a macro instruction to specify a discrete flag mode, and an instruction sequence generated by expansion thereof. It is appreciated from FIGS. 30A and 30B that the content of general purpose register R1 is modified by the execution of these macro instructions. Register R1 can be specified as an execution time option of the assembler. The individual creating the program executed by microprocessor 1A must be aware that the contents of a predetermined register is rewritten by a relevant macro instruction in using these macro instructions in source program PR1.

Figure 31:
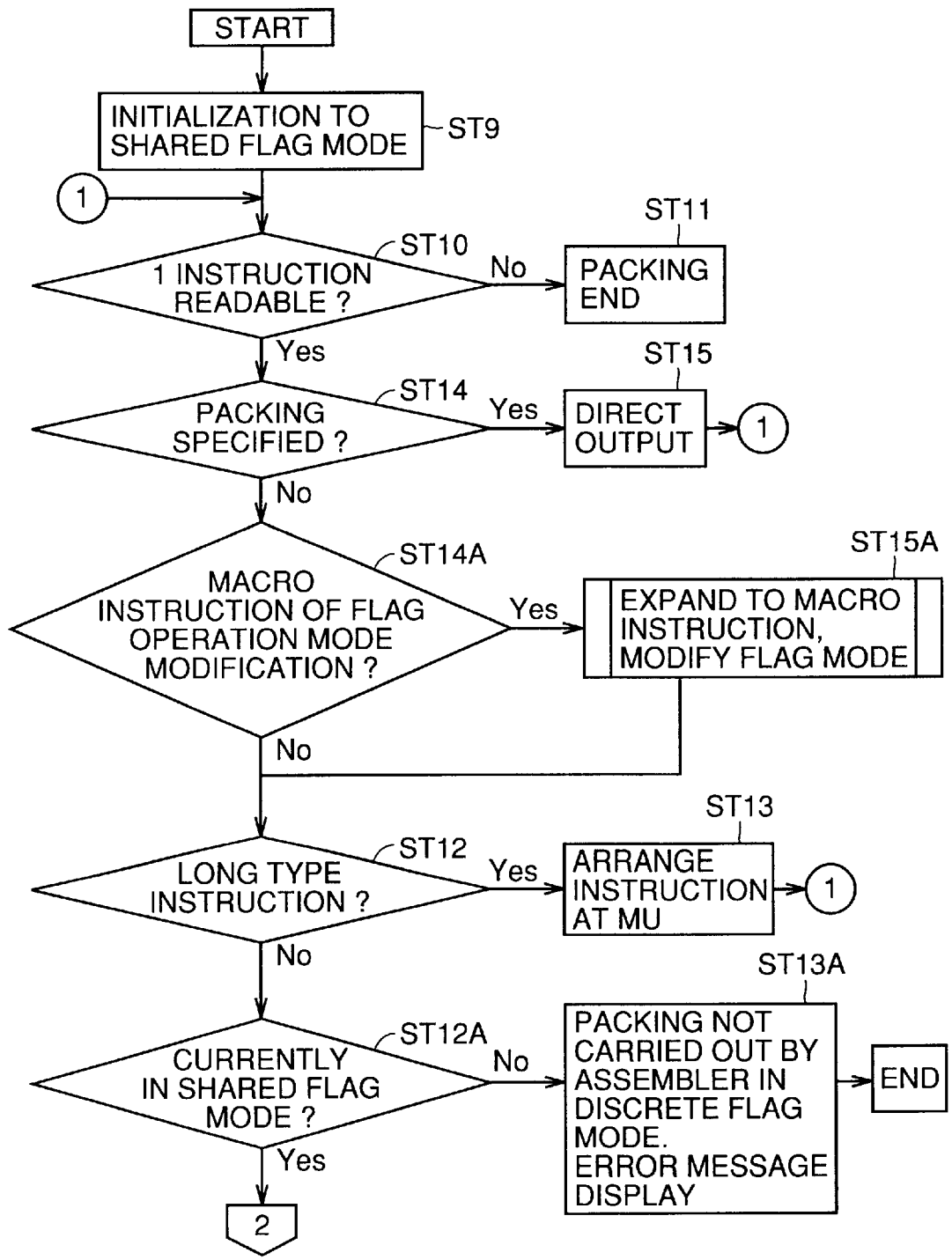
FIGS. 31, 32 and 33 are flow charts of packing an extended assembler according to the fifth embodiment.
Figure 32:
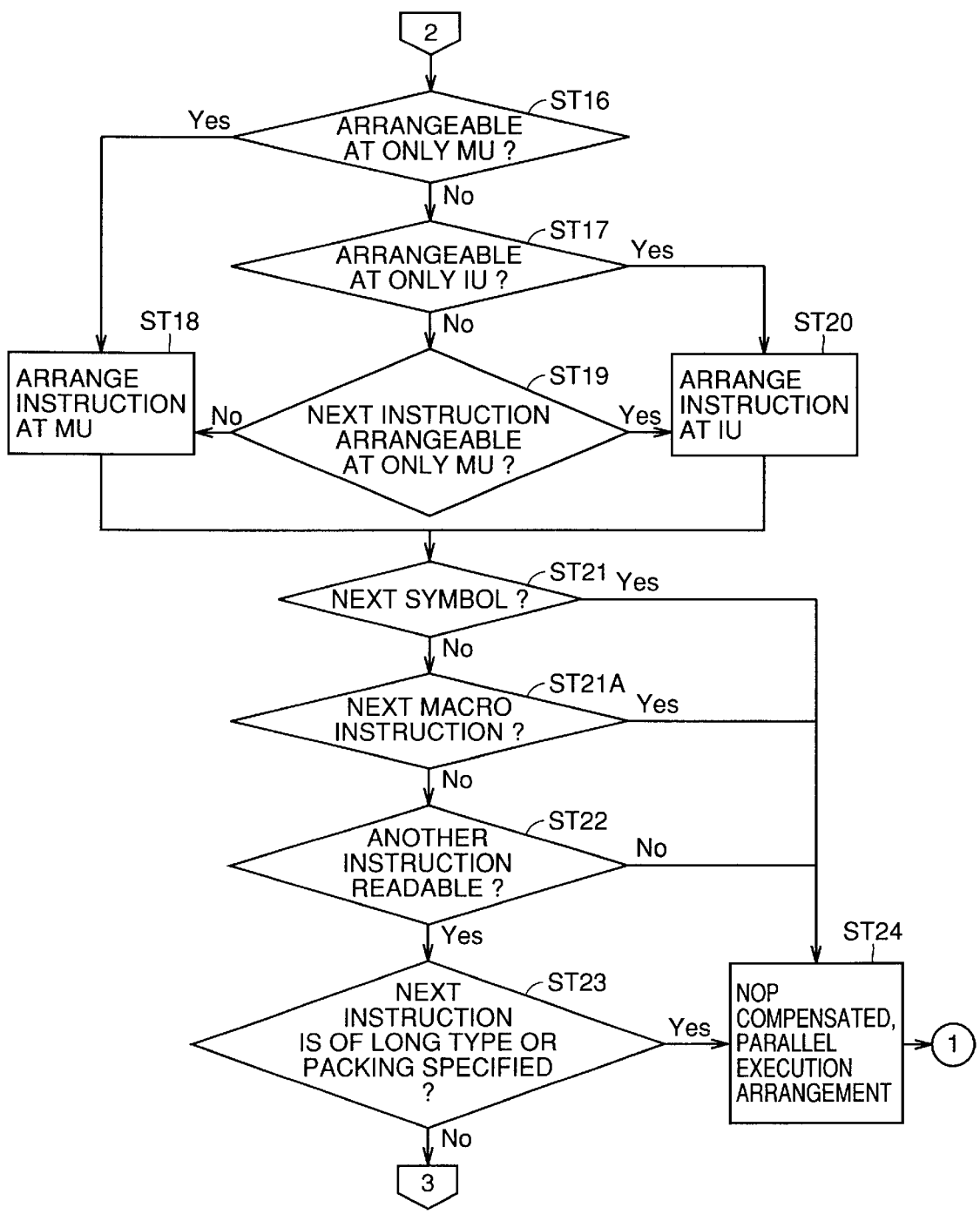
Figure 33:
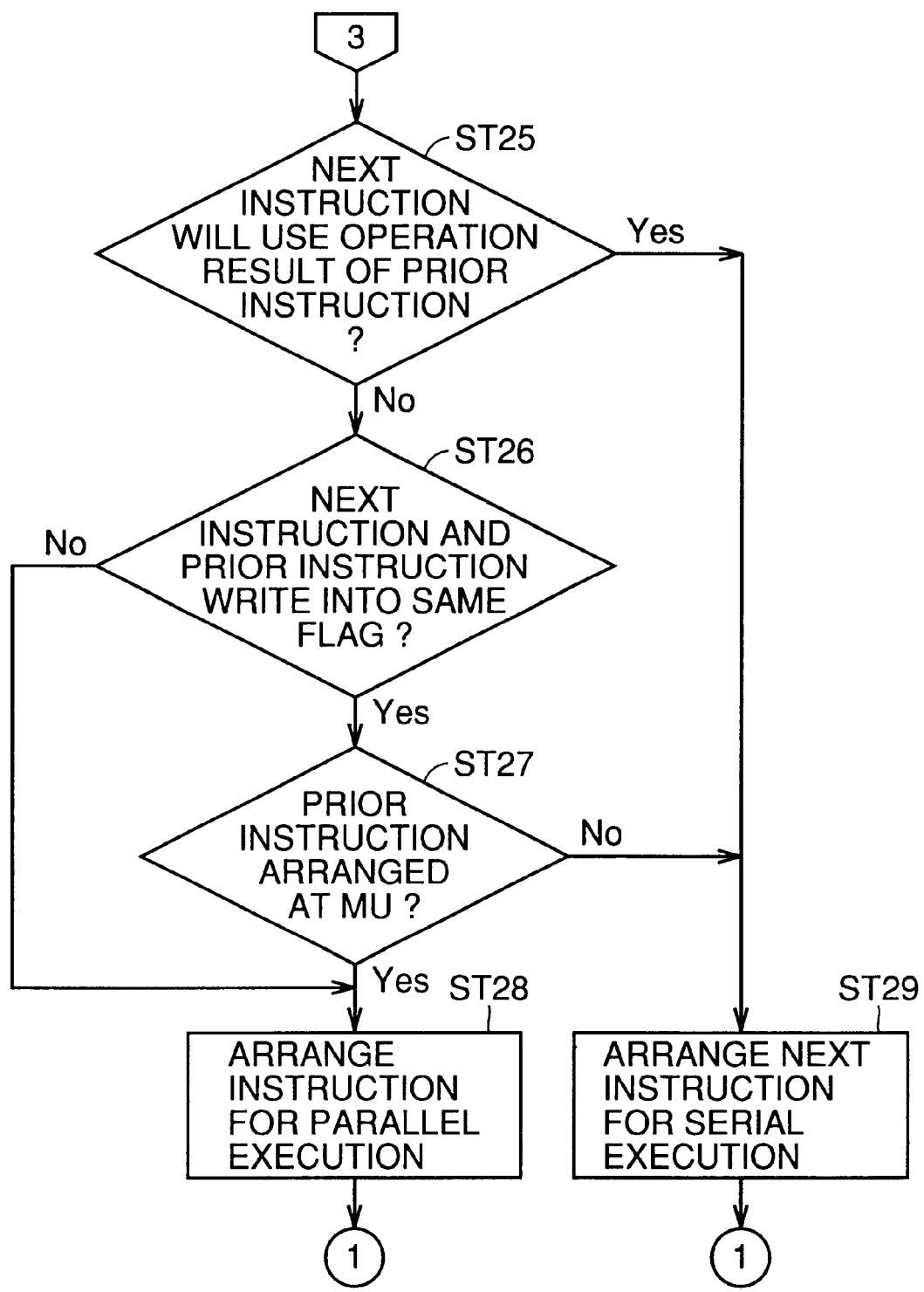

Upon reading in these macro instructions, extended assembler AS1 expands the instructions into the instruction sequence shown in FIGS. 30A and 30B and modifies the operation mode for packing to suit the specified flag operation mode at the same time. FIGS. 31–33 are flow charts of packing extended assembler AS1 of the fifth embodiment. According to the flow charts of FIGS. 31–33, the processes of reading in the macro instructions of FIGS. 30A and 30B, expanding to an instruction sequence, and modifying the flag operation mode (ST9, ST14A, ST15A, ST12A, ST13A and ST21A) are added to the processes of FIGS. 10–11. Since the remaining processes are similar to those shown in FIGS. 10–11, description thereof will not be repeated.

FIG. 34 shows a section of an algorithm using the instruction notation of the microprocessor employed in the fifth embodiment and the macro instruction employed in the extended assembler. FIG. 35 shows an example of packing the instruction sequence of FIG. 34 according to the flow charts of FIGS. 31–33.

According to the process of ST15A of FIG. 31, the macro instruction of flag operation mode modification that is read in is expanded into an instruction sequence by extended assembler AS1. Code IF in PSW1 is rewritten as described before. It is to be noted that when the discrete flag mode is specified (NO at ST12A), efficient packing cannot be carried out by the assembler. Therefore, an error is assumed in the present embodiment if a code specified packing, i.e., a code (line) of second intermediate program PR3 is not read, and the series of processes are terminated (ST13A). In the event that a share mode is specified, a packing process likewise FIGS. 10 and 11 is carried out for the read instruction.

Since the flag operation mode is not ascertained at the time of assembly in the second embodiment, all the instruction codes in the program must be packed manually. In contrast, the present embodiment allows the program to be partially packed automatically by using extended assembler AS1. Thus, programming is simplified.

In the present embodiment, the number of execution instructions is increased than the case where the program is executed by the same flag operation mode (without flag operation mode modification) due to the overhead by the instruction sequence generated by expanding the macro instruction to modify the flag operation mode. However, in practice, the overhead caused by the flag operation mode switching by the present embodiment is relatively small since the number of instructions executed with the mode fixed to either flag operation mode is considerably greater than the number of instructions of the instruction sequence generated by expanding the macro instruction. Therefore, the fifth embodiment allows improvement of the operation capability by switching the flag operation mode according to the feature of the program executed by microprocessor 1A, likewise the second embodiment.

By virtue of the first or second embodiment, scheduling the instruction execution sequence to avoid a conflict regarding access of PSW or PSW1 between integer unit 4 and memory unit 3 is no longer required. Therefore, the number of instructions that can be substantially executed at the same time can be increased than the conventional case. In other words, the substantial throughput is increased and the program size reduced.

By virtue of the second embodiment, the share mode of accessing PSW1 in PSW storage register 10A in common by integer unit 4 and memory unit 3 and the discrete mode of accessing the dedicated PSW for each unit can be set selectively according to the feature of the program that is executed by microprocessor 1A. Therefore, the operation capability can be improved according to the mode of the feature of the program. Therefore, the specification of the program becomes more versatile.

By virtue of the third embodiment, a conflict to access PSW2 in PSW storage register 10B is avoided between integer unit 4 and memory unit 3 even in the case where a SIMD instruction that specifies simultaneously a predetermined operation for the lower half-word and a predetermined operation for the lower half-word by microprocessor 1B is executed by any of units 3 or 4. Such an instruction can be utilized in a wider application to allow versatility in the software development tool.

By virtue of the first to fifth embodiments, the usage of either integer unit 4 or memory unit 3 for the execution of respective instructions in the program by the microprocessor can be determined at the time of assembly of that program.

According to the fourth embodiment, a particular functional unit 40 applies a predetermined operation on PSW3, and the resultant value thereof is written into register 10C as PSW3 in microprocessor 1C. Therefore, the global status of the operation in microprocessor 1C can be identified by just referring to the content of register 10C without any particular postprocess. The program can be reduced in size and simplified.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A processor including a plurality of functional units, each of a plurality of instructions being predetermined which of said plurality of functional units is to be used for execution when said plurality of instructions in a program are executed in parallel using said plurality of functional units, comprising:

a register storing control information shared by said plurality of functional units as to execution control of said program, and accessed in common by said plurality of functional units; and an arbitration unit arbitrating access according to predetermined priority as to access of said control information among said plurality of functional units when a content of said register is to be accessed simultaneously by said plurality of functional units during parallel execution of said plurality of instructions.

2. The processor according to claim 1, wherein said register further stores said control information as to execution control of said program provided individually for each of said plurality of functional units, wherein said arbitration unit includes a first arbitration unit selectively setting one of a share mode in which access of shared said control information is arbitrated according to said predetermined priority among said plurality of functional units and a discrete mode in which respective said control information provided individually are accessed by a corresponding functional unit, when a content of said register is to be accessed simultaneously by said plurality of functional units during parallel execution of said plurality of instructions.

3. The processor according to claim 2, wherein said first arbitration unit is selectively set to one of said share mode and said discrete mode according to a feature of said program.

4. The processor according to claim 1, wherein said plurality of instructions include an instruction designating simultaneously a predetermined operation on a high order half-word and said predetermined operation on a low order half-word, and
wherein said control information includes at least one flag to indicate status of the predetermined operation for each of said predetermined operation for said high order half-word and said low order half-word.

5. The processor according to claim 1, wherein determination is made in assembling said program which of said plurality of functional units is used to execute each of said plurality of instructions.

6. The processor according to claim 1, further comprising a particular functional unit applying a predetermined operation on said control information and writing a resultant value into said register as said control information.

7. A processor including a plurality of functional units, each of a plurality of instructions being predetermined which of said plurality of functional units is to be used for execution when said plurality of instructions in a program are executed in parallel using said plurality of functional units, comprising:
a register storing individual control information as to execution control of said program, said individual control information being provided for each said functional unit, said register being accessed in common by said plurality of functional units; and
an arbitration unit having each of said individual control information accessed individually by a corresponding functional unit when a content of said register is to be accessed simultaneously by said plurality of functional units during parallel execution of said plurality of instructions.

8. The processor according to claim 7, wherein said plurality of instructions include an instruction designating simultaneously a predetermined operation on a high order half-word and said predetermined operation on a low order half-word, and
wherein said individual control information includes at least one flag to indicate status of the predetermined operation for each of said predetermined operation for said high order half-word and said low order half-word.

9. The processor according to claim 7, wherein determination is made in assembling said program which of said plurality of functional units is used to execute each of said plurality of instructions.

10. The processor according to claim 7, further comprising a particular functional unit applying a predetermined operation on said individual control information and writing a resultant value as said individual control information.

11. An instruction allocation controller to predetermine which of a plurality of functional units is used to execute each of a plurality of instructions for a processor including said plurality of functional units, and executing said program using said plurality of functional units by processing a packet having a plurality of fields corresponding to said plurality of functional units and in which a plurality of instructions in a program are stored,
said processor including a register storing control information as to execution control of said program, and accessed in common by said plurality of functional units,
said instruction allocation controller comprising:
a read unit sequentially reading in said instruction from said program, and
a storage unit allocating and storing said instruction read in by said read unit to any field in said packet, said storage unit including
a simultaneous access determination unit to determine whether a content of said register is accessed simultaneously or not when a subsequent instruction read in by said read unit and a prior instruction already stored in said packet are executed in parallel,
an allocation determination unit responsive to determination of simultaneous access by said simultaneous access determination unit to determine whether said prior instruction and said subsequent instruction can be allocated to said plurality of fields in a same packet according to a predetermined priority, and
an allocation unit to allocate said prior instruction and said subsequent instruction to respective plurality of fields in said same packet so that said prior instruction and said subsequent instruction are executed in parallel in response to determination of admissible allocation by said allocation determination unit, and to allocate said prior instruction and said subsequent instruction to respective plurality of fields in said same packet so that said prior instruction and said subsequent instruction are executed serially in response to determination of inadmissible allocation by said allocation determination unit,
wherein said predetermined priority is the priority among said plurality of functional units as to access of said control information.

12. The instruction allocation controller according to claim 11, wherein said register is set to an operation mode of one of a share mode and a discrete mode, and storing said control information shared by said plurality of functional units when in the share mode, and storing said control information provided individually for each of said functional units when in the discrete mode,
said instruction allocation controller further comprising:
a mode set unit to set the operation mode of said register according to an instruction when said instruction read in by said read unit is a mode modification instruction designating modification of said operation mode;
a predetermined processing unit executing a predetermined process for said instruction read in by said read unit when said discrete mode is set by said mode set unit; and
an execution unit executing said storage unit for said instruction read in by said read unit when said share mode is set by said mode set unit.

13. The instruction allocation controller according to claim 11, wherein said instruction allocation controller is applied to an assembler to translate said program into an executable format.

* * * * *